US010127425B2

(12) United States Patent
Panchawagh et al.

(10) Patent No.: US 10,127,425 B2
(45) Date of Patent: Nov. 13, 2018

(54) DUAL-MODE CAPACITIVE AND ULTRASONIC FINGERPRINT AND TOUCH SENSOR

(71) Applicant: QUALCOMM Incorporated, San Diego, CA (US)

(72) Inventors: Hrishikesh Vijaykumar Panchawagh, Cupertino, CA (US); Kostadin Dimitrov Djordjev, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/404,893

(22) Filed: Jan. 12, 2017

(65) Prior Publication Data
US 2018/0196982 A1  Jul. 12, 2018

(51) Int. Cl.
G06K 9/00        (2006.01)

(52) U.S. Cl.
CPC ....... G06K 9/0002 (2013.01); G06K 9/00073 (2013.01)

(58) Field of Classification Search
CPC .......................... G06K 9/0002; G06K 9/00073
USPC ......................................................... 382/124
See application file for complete search history.

(56) References Cited

U.S. PATENT DOCUMENTS 9,195,879 B1  11/2015 Du et al.
9,323,393 B2   4/2016 Djordjev et al.
2007/0085838 A1* 4/2007 Ricks .................... G06F 3/0412
                                                          345/173
2014/0354597 A1  12/2014 Kitchens, II et al.
2014/0354905 A1* 12/2014 Kitchens ............... G06F 1/3215
                                                          349/12
2014/0368422 A1* 12/2014 Gupta .................... G06F 3/017
                                                          345/156
2015/0241393 A1   8/2015 Ganti et al.
(Continued)

FOREIGN PATENT DOCUMENTS

EP          1464029 A1    10/2004

OTHER PUBLICATIONS

Fesenko P., "Capacitive Micromachined Ultrasonic Transducer (cMUT) for Biometric Applications," Thesis for the Degree of Erasmus Mundus Master of Nanoscience and Nanotechnology, Master thesis at the University of Goteborg, Sweden, Chalmers University of Technology, Jan. 1, 2012, pp. 1-46, XP055342874, Retrieved from the Internet: URL:http://publications.lib.chalmers.se/records/fulltext/166084.pdf [retrieved on Feb. 7, 2017].

(Continued)

Primary Examiner — Ping Hsieh
(74) Attorney, Agent, or Firm — Weaver Austin Villeneuve & Sampson LLP QUAL

(57) ABSTRACT

This disclosure provides systems, methods and apparatus for a controller configured to switch operation of a fingerprint sensor among operational modes. In one aspect, a fingerprint sensor may switch from operating in a first operational mode to a second operational mode based on one or more characteristics of fingerprint image data generated with the fingerprint sensor operating in the first operational mode. One of the first operational mode or the second operational mode may be a capacitive sensing mode, and the other may be an ultrasonic sensing mode.

18 Claims, 16 Drawing Sheets

(56) References Cited

U.S. PATENT DOCUMENTS

| | | | |
|---|---|---|---|
| 2016/0078697 A1* | 3/2016 | Lee .................. | G07C 9/00087 |
| | | | 340/5.53 |
| 2016/0171281 A1 | 6/2016 | Park et al. | |
| 2016/0314334 A1 | 10/2016 | He et al. | |
| 2017/0075448 A1* | 3/2017 | Kang ..................... | G06F 3/044 |
| 2017/0090024 A1* | 3/2017 | Kitchens, II ........... | G01S 7/539 |
| 2018/0055369 A1* | 3/2018 | Burns ................. | A61B 5/0095 |

OTHER PUBLICATIONS

International Search Report and Written Opinion—PCT/US2017/064949—ISA/EPO—dated May 11, 2018.

Partial International Search Report—PCT/US2017/064949—ISA/EPO—dated Mar. 16, 2018.

Qiu Y., et al., "Piezoelectric Micromachined Ultrasound Transducer (PMUT) Arrays for Integrated Sensing, Actuation and Imaging", Sensors, vol. 15, No. 4, Apr. 3, 2015, pp. 8020-8041, XP055309471, DOI: 10.3390/S150408020.

Ross A.A., et al., "Handbook of Multibiometrics", Feb. 11, 2009, XP055457349, Retrieved from the Internet: URL: http://www.springer.com/gp/book/9780387222967 [retrieved on Mar. 7, 2018], p. 46.

\* cited by examiner

DUAL-MODE CAPACITIVE AND ULTRASONIC FINGERPRINT AND TOUCH SENSOR

TECHNICAL FIELD

This disclosure relates to fingerprint and touch sensors, and more specifically, to a fingerprint and touch sensor operating in capacitive sensing and ultrasonic sensing modes.

DESCRIPTION OF THE RELATED TECHNOLOGY

Ultrasonic sensor systems may use an ultrasonic transmitter to generate and send an ultrasonic wave through an ultrasonically transmissive medium or media and towards an object to be detected. The ultrasonic transmitter may be operatively coupled to an ultrasonic sensor array configured to detect portions of the ultrasonic wave that are reflected from the object. For example, in ultrasonic fingerprint sensors, an ultrasonic pulse may be produced by starting and stopping the transmitter during a short interval of time. At each material interface encountered by the ultrasonic pulse, a portion of the ultrasonic pulse may be reflected.

For example, in the context of an ultrasonic fingerprint sensor, the ultrasonic wave may travel through a platen on which an object such as a person's finger may be placed to obtain fingerprint image information. After passing through the platen, some portions of the ultrasonic wave may encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor array. The reflected signals associated with the finger may be processed and converted to digital values representing the signal strengths of the reflected signals. When such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint sensor or other type of biometric scanner.

Capacitive fingerprint sensors also may be used to obtain fingerprint image information. In capacitive sensor systems, capacitive coupling between an electrode and a person's finger, and between the electrode and another electrode can model a capacitive voltage divider and the voltage at the intermediate point may be "read out" and converted to a digital value that also may be used, in part, to produce an image of the fingerprint.

In comparison with ultrasonic fingerprint sensors, capacitive fingerprint sensors may be simpler to manufacture, and therefore, cost less than ultrasonic fingerprint sensors. Capacitive fingerprint sensors also may use lower power, operate faster, are more stable over a wider temperature range, and provide high-resolution fingerprint images which make matching (e.g., authenticating the fingerprint image) easier to implement with lower complexity algorithms and lower memory requirements. However, capacitive fingerprint sensors limit the choice of the platen, for example, to thin platens or non-metallic platens. Moreover, capacitive fingerprint sensors also may be more prone to "spoofing" using fake fingerprints, and may be less robust (e.g., sweat or lotion on a finger may disrupt the fingerprint imaging).

By contrast, ultrasonic fingerprint sensors may be compatible with more platens (e.g., thicker and metallic platens), are more robust (e.g., can provide a fingerprint image despite sweat, lotion, etc. on a finger), and are less prone to spoofing (e.g., by penetrating into live tissue and imaging inside the live tissue for additional security). However, ultrasonic fingerprint sensors are more complex due to use of specialized piezoelectric materials and in general may be more sensitive to the layers between the sensor and finger, temperature, and coupling between finger and the platen surface.

SUMMARY

The systems, methods and devices of this disclosure each have several innovative aspects, no single one of which is solely responsible for the desirable attributes disclosed herein.

In some aspects, a system includes a fingerprint sensor and a controller. The controller is configured to switch the fingerprint sensor from operating in a first operational mode to a second operational mode based on one or more characteristics of a first fingerprint image data generated based on the fingerprint sensor operating in the first operational mode. The first operational mode or the second operational mode is a capacitive sensing mode, and the other is an ultrasonic sensing mode.

In some implementations, the one or more characteristics include an image quality corresponding to an image of a fingerprint represented by the first fingerprint image data.

In some implementations, the controller is further configured to determine one or more characteristics of a second fingerprint image data generated based on the fingerprint sensor operating in the second operational mode, and authenticate a fingerprint represented by the second fingerprint image data based on the one or more characteristics of the second fingerprint image data. The one or more characteristics of the first fingerprint image data may include a first image quality corresponding to a first image of a fingerprint, and the one or more characteristics of the second fingerprint image data may include a second image quality corresponding to a second image of the fingerprint. The second image quality may be higher than the first image quality, and the controller may be configured to authenticate the fingerprint corresponding to the second fingerprint image data based on the second image quality meeting or exceeding a threshold image quality.

In some implementations, the controller is further configured to provide a first drive signal to an electrode of the fingerprint sensor to operate the fingerprint sensor in the first operational mode, and configured to provide a second drive signal to the electrode of the fingerprint sensor to operate the fingerprint sensor in the second operational mode. In such implementations, the first drive signal and the second drive signal are different. For example, the first drive signal and the second drive signal can be at different frequencies. Also, the fingerprint sensor can include a piezoelectric material layer, and one of the first drive signal or the second drive signal corresponding to the fingerprint sensor operating in the ultrasonic sensing mode can be within a frequency range corresponding to a resonant frequency of the piezoelectric material layer. The other of the first drive signal or the second drive signal corresponding to the fingerprint sensor operating in the capacitive sensing mode can be outside the frequency range.

In some implementations, the controller is further configured to receive the first fingerprint image data generated based on the fingerprint sensor operating in the first operational mode and receive a second fingerprint image data generated based on the fingerprint sensor operating in the second operational mode, and generate a third fingerprint image data based on the first fingerprint image data and the second fingerprint image data.

In some implementations, the controller is further configured to read one or more signals from the fingerprint sensor when the fingerprint sensor is operating in the capacitive sensing mode and the ultrasonic sensing mode. The reading of the one or more signals can be based on an acquisition time delay corresponding to the operational mode of the fingerprint sensor.

In some aspects, a method includes configuring, by a controller, a fingerprint sensor to operate in a first operational mode to generate a first fingerprint image data. One or more characteristics of the first fingerprint image data are determined. The fingerprint sensor is configured to operate in a second operational mode to generate a second fingerprint image data. The fingerprint sensor is configured to operate in the second operational mode based on the one or more characteristics of the first fingerprint image data. One or more characteristics of the second fingerprint image data are determined. A fingerprint represented by the second fingerprint image data is authenticated based on the one or more characteristics of the second fingerprint image data. The first operational mode or the second operational mode can be a capacitive sensing mode, and the other can be an ultrasonic sensing mode.

In some aspects, a non-transitory computer readable medium has software stored thereon. The software includes instructions for controlling a system to configure a fingerprint sensor to operate in a first operational mode to generate a first fingerprint image data. One or more characteristics of the first fingerprint image data are determined. The fingerprint sensor is configured to operate in a second operational mode to generate a second fingerprint image data. The fingerprint sensor is configured to operate in the second operational mode based on the one or more characteristics of the first fingerprint image data. One or more characteristics of the second fingerprint image data are determined. A fingerprint represented by the second fingerprint image data is authenticated based on the one or more characteristics of the second fingerprint image data.

In some aspects, a system having a touchscreen display includes a fingerprint sensor and a controller. The controller is configured to operate the fingerprint sensor in a touch recognition mode having a first operational mode as a primary mode to determine that a finger has touched the touchscreen display and a second operational mode as an alternative mode to determine that the finger has touched the touchscreen display, and operate the fingerprint sensor in a fingerprint authentication mode having the second operational mode as the primary mode and the first operational mode as an alternative mode to determine that a fingerprint of the finger corresponds to an authorized fingerprint and a first.

In some implementations, the controller is further configured to operate the fingerprint sensor in a gesture recognition mode to determine interactions of one or more fingers with the touchscreen display having the first operational mode as the primary mode and the second operational mode as the alternative mode.

BRIEF DESCRIPTION OF THE DRAWINGS

Details of one or more implementations of the subject matter described in this specification are set forth in the accompanying drawings and the description below. Other features, aspects and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
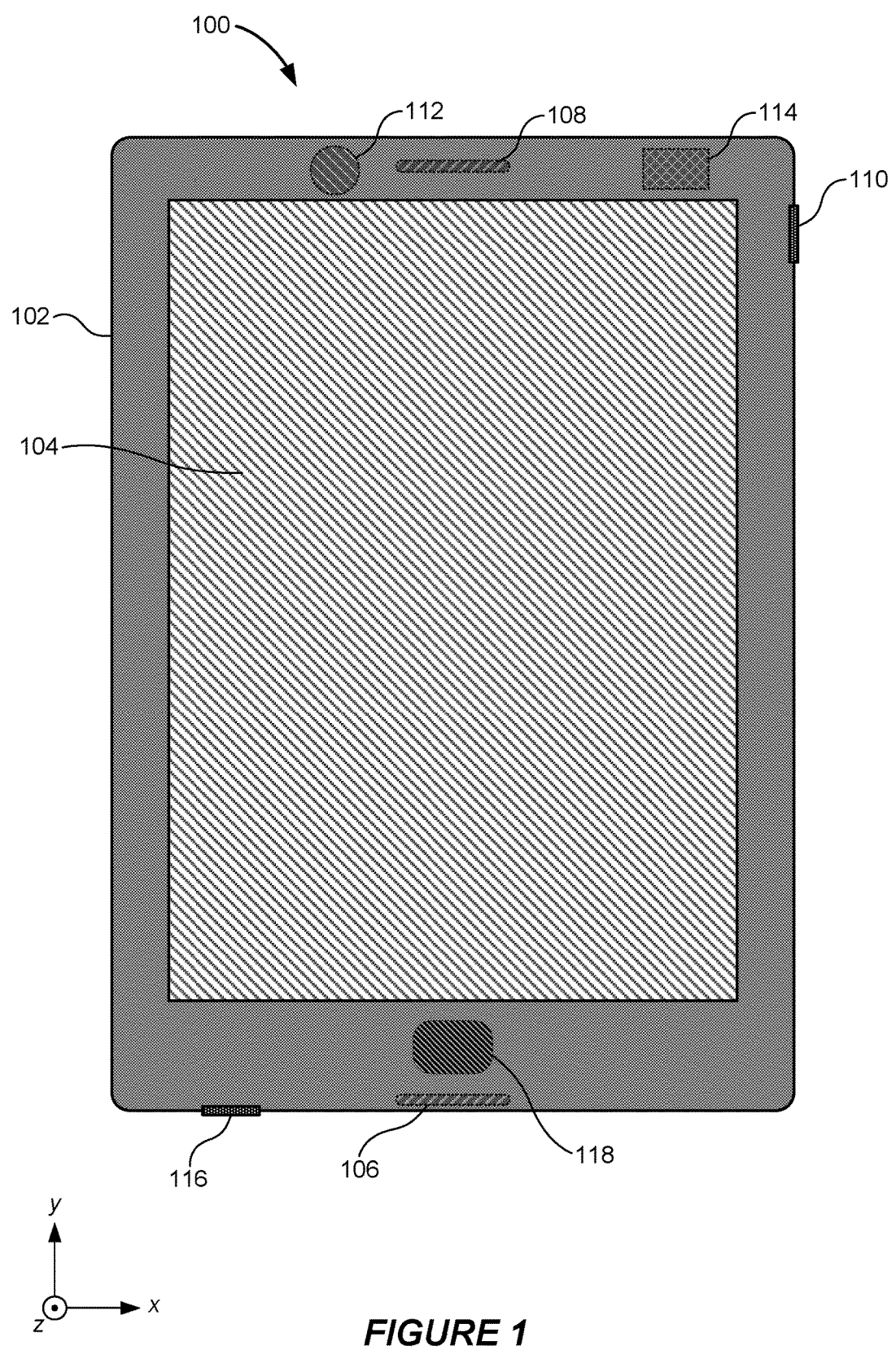
FIG. 1 shows a front view of a diagrammatic representation of an example mobile device that includes an ultrasonic sensing system according to some implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headband, patches, etc., Bluetooth® devices, personal data assistants (PDAs), wireless electronic mail receivers, hand-held or portable computers, netbooks, notebooks, smartbooks, tablet computers, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some fingerprint sensors may be implemented with an ultrasonic sensor system using piezoelectric material for the transmission and receiving of ultrasonic waves. For example, a voltage applied across piezoelectric material corresponding to a transmitter may result in the piezoelectric material stretching or contracting (e.g., deformed such that it is strained in response to the applied voltage), resulting in the generation of the ultrasonic wave, as previously discussed. The reflected signals (e.g., the reflected portions of the ultrasonic wave, as previously discussed) may result in the stretching or contracting of piezoelectric material corresponding to a receiver. This results in the generation of a surface charge, and therefore, a voltage across the piezoelectric material that may be used as an electrical output signal representing a portion of raw image data that represents fingerprint image data.

Some implementations of the subject matter described in this disclosure may include operating a fingerprint sensor in a capacitive sensing mode and an ultrasonic sensing mode. The fingerprint sensor may be configured (e.g., by a processing unit, as discussed later herein) to operate in one mode (e.g., first in the capacitive sensing mode) and fingerprint image data may be generated based on capacitive sensing of a finger. If a characteristic, such as image quality, of the fingerprint image data is poor, then the fingerprint sensor may be configured to operate in a second mode (e.g., switch to the ultrasonic sensing mode from the capacitive sensing mode) and fingerprint image data may then be generated based on the ultrasonic sensing of the finger. If the image quality is good, then the fingerprint image data generated using the fingerprint sensor in the ultrasonic sensing mode may be used to authenticate the corresponding fingerprint.

In some implementations, the fingerprint sensor may be configured to switch between the two operational modes (i.e., capacitive sensing and ultrasonic sensing modes) by driving an electrode of the fingerprint sensor differently. For example, to operate the fingerprint sensor in the ultrasonic sensing mode, a drive signal may be applied to an electrode of the fingerprint sensor that is used to apply a voltage across a piezoelectric transmitter. To operate the fingerprint sensor in the capacitive sensing mode, a drive signal with a different frequency may be applied to the same electrode. The frequency of the drive signal in the capacitive sensing mode may be outside of a resonant frequency range of the piezoelectric material. For the ultrasonic sensing mode, the drive signal may be within the resonant frequency range of the piezoelectric material so that an ultrasonic wave may be generated as the piezoelectric material of the fingerprint sensor may resonate at an ultrasonic frequency.

Particular implementations of the subject matter described in this disclosure may be implemented to realize one or more of the following potential advantages. The same fingerprint sensor may be configured to operate in both capacitive and ultrasonic sensing modes (i.e., a hybrid fingerprint or dual-mode sensor capable of operating as a capacitive fingerprint sensor and as an ultrasonic fingerprint sensor), providing the benefits of both modes, as previously discussed. Moreover, by switching the operational mode based on the characteristics of the fingerprint image data, a more reliable authentication may be performed. For example, if the fingerprint sensor operates in a "preferred" mode as the first operational mode and the image quality of the fingerprint image data is poor, then it may be switched to operate in an "alternative" mode as the second operational mode to capture a fingerprint image data with higher quality.

FIG. 1 shows a diagrammatic representation of an example mobile device 100 that includes an ultrasonic sensing system according to some implementations. The mobile device 100 may be representative of, for example, various portable computing devices such as cellular phones, smartphones, multimedia devices, personal gaming devices, tablet computers and laptop computers, among other types of portable computing devices. However, various implementations described herein are not limited in application to portable computing devices. Indeed, various techniques and principles disclosed herein may be applied in traditionally non-portable devices and systems, such as in computer monitors, television displays, kiosks, vehicle navigation devices and audio systems, among other applications. Additionally, various implementations described herein are not limited in application to devices that include displays.

The mobile device 100 generally includes a housing (or "case") 102 within which various circuits, sensors and other electrical components reside. In the illustrated example implementation, the mobile device 100 also includes a touchscreen display (also referred to herein as a "touch-sensitive display") 104. The touchscreen display 104 generally includes a display and a touchscreen arranged over or otherwise incorporated into or integrated with the display. The display 104 may generally be representative of any of a variety of suitable display types that employ any of a variety of suitable display technologies. For example, the display 104 may be a digital micro-shutter (DMS)-based display, a light-emitting diode (LED) display, an organic LED (OLED) display, a liquid crystal display (LCD), an LCD display that uses LEDs as backlights, a plasma display, an interferometric modulator (IMOD)-based display, or another type of display suitable for use in conjunction with touch-sensitive user interface (UI) systems.

The mobile device 100 may include various other devices or components for interacting with, or otherwise communicating information to or receiving information from, a user. For example, the mobile device 100 may include one or more microphones 106, one or more speakers 108, and in some cases one or more at least partially mechanical buttons 110. The mobile device 100 may include various other components enabling additional features such as, for example, one or more video or still-image cameras 112, one or more wireless network interfaces 114 (for example, Bluetooth, WiFi or cellular) and one or more non-wireless interfaces 116 (for example, a universal serial bus (USB) interface or an HDMI interface).

The mobile device 100 may include an ultrasonic sensing system 118 capable of scanning and imaging an object signature, such as a fingerprint, palm print or handprint. In some implementations, the ultrasonic sensing system 118 may function as a touch-sensitive control button. In some implementations, a touch-sensitive control button may be implemented with a mechanical or electrical pressure-sensitive system that is positioned under or otherwise integrated with the ultrasonic sensing system 118. In other words, in some implementations, a region occupied by the ultrasonic sensing system 118 may function both as a user input button to control the mobile device 100 as well as a fingerprint sensor to enable security features such as user authentication features.

Figure 2A:
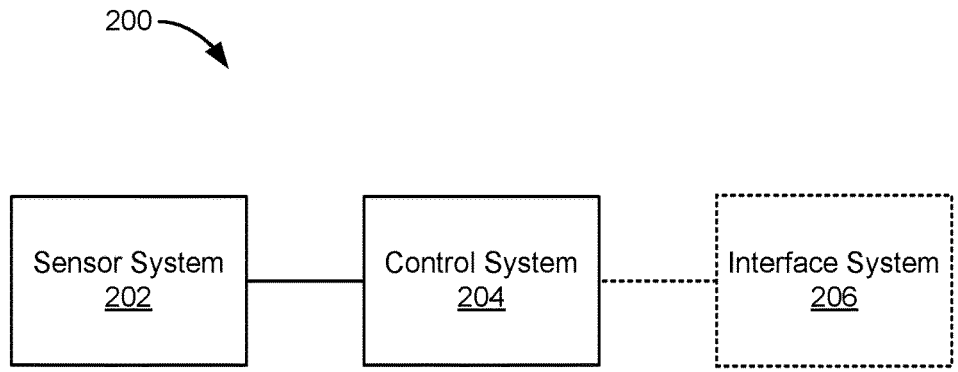
FIG. 2A shows a block diagram representation of components of an example ultrasonic sensing system according to some implementations.

FIG. 2A shows a block diagram representation of components of an example ultrasonic sensing system 200 according to some implementations. As shown, the ultrasonic sensing system 200 may include a sensor system 202 and a control system 204 electrically coupled to the sensor system 202. The sensor system 202 may be capable of scanning an object and providing raw measured image data usable to obtain an object signature, for example, such as a fingerprint of a human finger. The control system 204 may be capable of controlling the sensor system 202 and processing the raw measured image data received from the sensor system. In some implementations, the ultrasonic sensing system 200 may include an interface system 206 capable of transmitting or receiving data, such as raw or processed measured image data, to or from various components within or integrated with the ultrasonic sensing system 200 or, in some implementations, to or from various components, devices or other systems external to the ultrasonic sensing system.

Figure 2B:
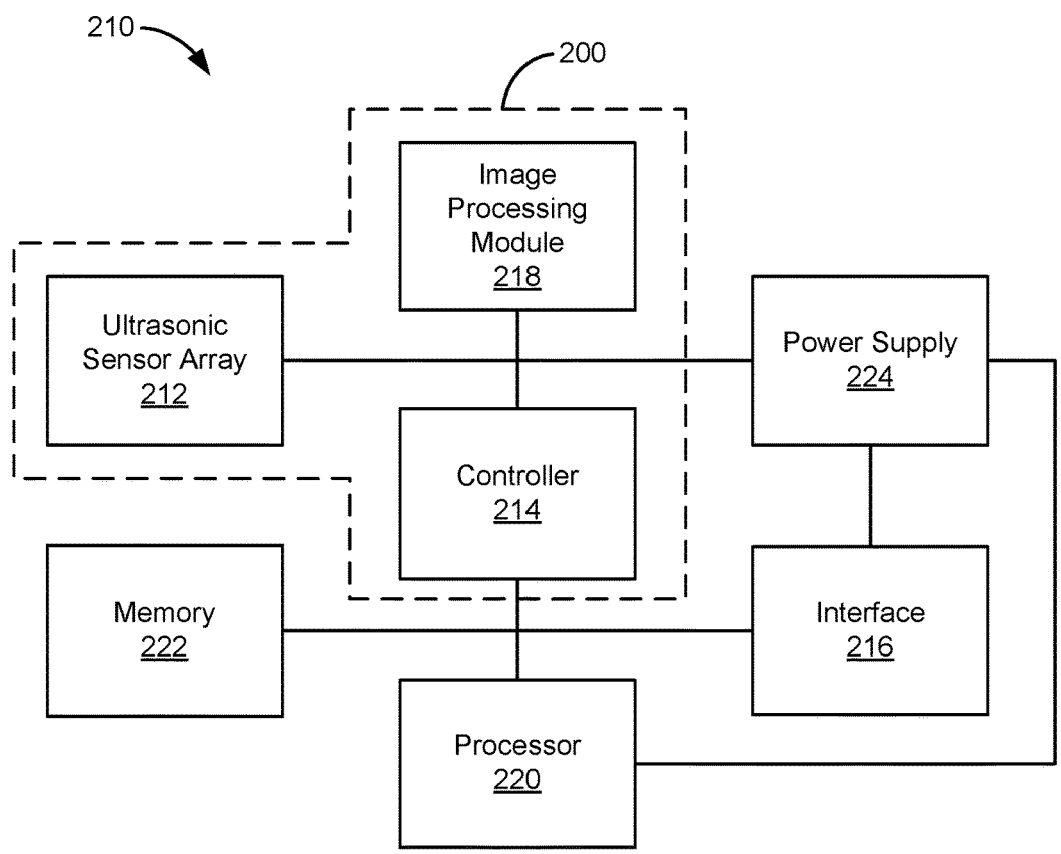
FIG. 2B shows a block diagram representation of components of an example mobile device that includes the ultrasonic sensing system of FIG. 2A.

FIG. 2B shows a block diagram representation of components of an example mobile device 210 that includes the ultrasonic sensing system 200 of FIG. 2A. For example, the mobile device 210 may be a block diagram representation of the mobile device 100 shown in and described with reference to FIG. 1 above. The sensor system 202 of the ultrasonic sensing system 200 of the mobile device 210 may be implemented with an ultrasonic sensor array 212. The control system 204 of the ultrasonic sensing system 200 may be implemented with a controller 214 that is electrically coupled to the ultrasonic sensor array 212. While the controller 214 is shown and described as a single component, in some implementations, the controller 214 may collectively refer to two or more distinct control units or processing units in electrical communication with one another. In some implementations, the controller 214 may include one or more of a general purpose single- or multi-chip processor, a central processing unit (CPU), a digital signal processor (DSP), an applications processor, an application specific integrated circuit (ASIC), a field programmable gate array (FPGA) or other programmable logic device (PLD), discrete gate or transistor logic, discrete hardware components, or any combination thereof designed to perform the functions and operations described herein.

The ultrasonic sensing system 200 of FIG. 2B may include an image processing module 218. In some implementations, raw measured image data provided by the ultrasonic sensor array 212 may be sent, transmitted, communicated or otherwise provided to the image processing module 218. The image processing module 218 may include any suitable combination of hardware, firmware and software configured, adapted or otherwise operable to process the image data provided by the ultrasonic sensor array 212. In some implementations, the image processing module 218 may include signal or image processing circuits or circuit components including, for example, amplifiers (such as instrumentation amplifiers or buffer amplifiers), analog or digital mixers or multipliers, switches, analog-to-digital converters (ADCs), passive or active analog filters, among others. In some implementations, one or more of such circuits or circuit components may be integrated within the controller 214, for example, where the controller 214 is implemented as a system-on-chip (SoC) or system-in-package (SIP). In some implementations, one or more of such circuits or circuit components may be integrated within a DSP included within or coupled to the controller 214. In some implementations, the image processing module 218 may be implemented at least partially via software. For example, one or more functions of, or operations performed by, one or more of the circuits or circuit components just described may instead be performed by one or more software modules executing, for example, in a processing unit of the controller 214 (such as in a general purpose processor or a DSP).

In some implementations, in addition to the ultrasonic sensing system 200, the mobile device 210 may include a separate processor 220, a memory 222, an interface 216 and a power supply 224. In some implementations, the controller 214 of the ultrasonic sensing system 200 may control the ultrasonic sensor array 212 and the image processing module 218, and the processor 220 of the mobile device 210 may control other components of the mobile device 210. In some implementations, the processor 220 communicates data to the controller 214 including, for example, instructions or commands. In some such implementations, the controller 214 may communicate data to the processor 220 including, for example, raw or processed image data. It should also be understood that, in some other implementations, the functionality of the controller 214 may be implemented entirely, or at least partially, by the processor 220. In some such implementations, a separate controller 214 for the ultrasonic sensing system 200 may not be required because the functions of the controller 214 may be performed by the processor 220 of the mobile device 210.

Depending on the implementation, one or both of the controller 214 and processor 220 may store data in the memory 222. For example, the data stored in the memory 222 may include raw measured image data, filtered or otherwise processed image data, estimated PSF or estimated image data, and final refined PSF or final refined image data. The memory 222 may store processor-executable code or other executable computer-readable instructions capable of execution by one or both of the controller 214 and the processor 220 to perform various operations (or to cause other components such as the ultrasonic sensor array 212, the image processing module 218, or other modules to perform operations), including any of the calculations, computations, estimations or other determinations described herein (including those presented in any of the equations below). It should also be understood that the memory 222 may collectively refer to one or more memory devices (or "components"). For example, depending on the implementation, the controller 214 may have access to and store data in a different memory device than the processor 220. In some implementations, one or more of the memory components may be implemented as a NOR- or NAND-based Flash memory array. In some other implementations, one or more of the memory components may be implemented as a different type of non-volatile memory. Additionally, in some implementations, one or more of the memory components may include a volatile memory array such as, for example, a type of RAM.

In some implementations, the controller 214 or the processor 220 may communicate data stored in the memory 222 or data received directly from the image processing module 218 through an interface 216. For example, such communicated data can include image data or data derived or otherwise determined from image data. The interface 216 may collectively refer to one or more interfaces of one or more various types. In some implementations, the interface 216 may include a memory interface for receiving data from or storing data to an external memory such as a removable memory device. Additionally or alternatively, the interface 216 may include one or more wireless network interfaces or one or more wired network interfaces enabling the transfer of raw or processed data to, as well as the reception of data from, an external computing device, system or server.

A power supply 224 may provide power to some or all of the components in the mobile device 210. The power supply 224 may include one or more of a variety of energy storage devices. For example, the power supply 224 may include a rechargeable battery, such as a nickel-cadmium battery or a lithium-ion battery. Additionally or alternatively, the power supply 224 may include one or more supercapacitors. In some implementations, the power supply 224 may be chargeable (or "rechargeable") using power accessed from, for example, a wall socket (or "outlet") or a photovoltaic device (or "solar cell" or "solar cell array") integrated with the mobile device 210. Additionally or alternatively, the power supply 224 may be wirelessly chargeable.

As used hereinafter, the term "processing unit" refers to any combination of one or more of a controller of an ultrasonic system (for example, the controller 214), an image processing module (for example, the image processing module 218), or a separate processor of a device that includes the ultrasonic system (for example, the processor 220). In other words, operations that are described below as being performed by or using a processing unit may be performed by one or more of a controller of the ultrasonic system, an image processing module, or a separate processor of a device that includes the ultrasonic sensing system.

Figure 3A:
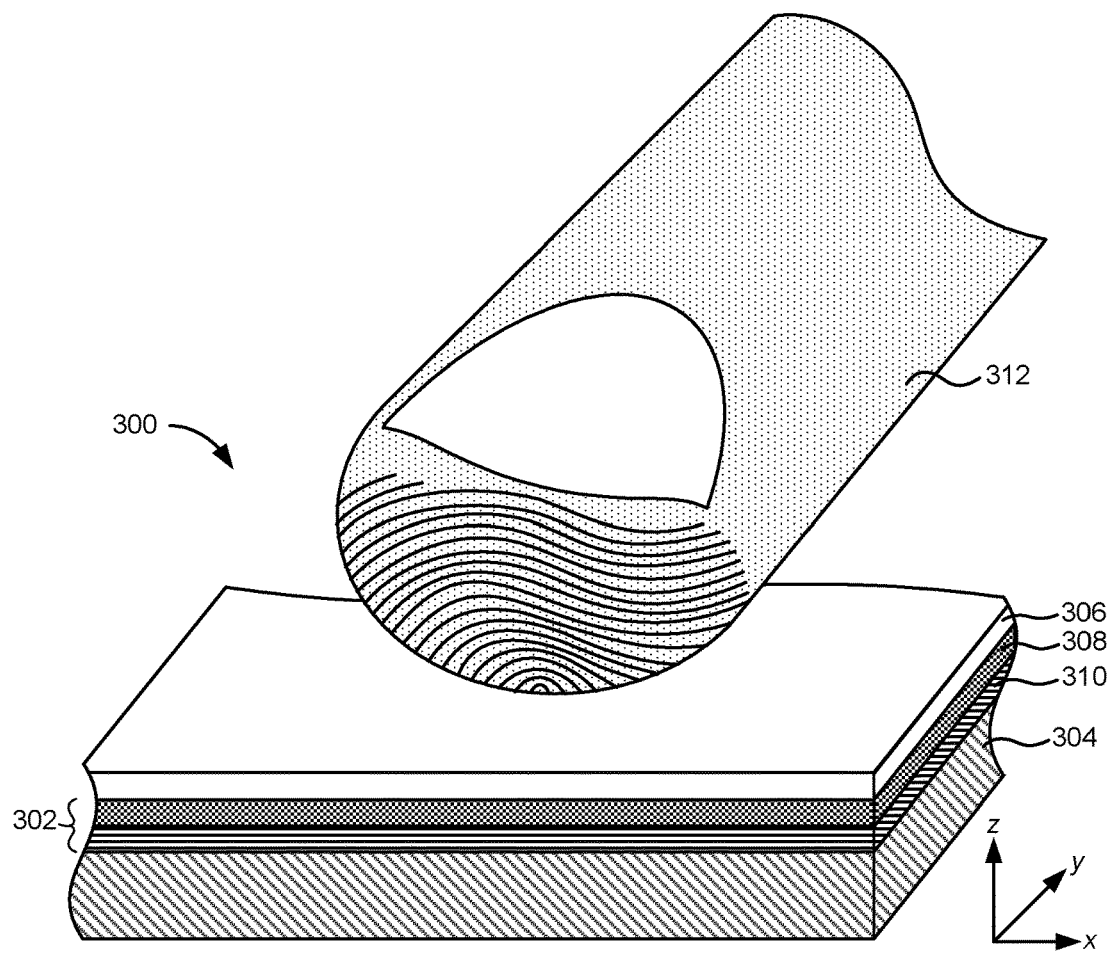
FIG. 3A shows a cross-sectional projection view of a diagrammatic representation of a portion of an example ultrasonic sensing system according to some implementations.
Figure 3B:
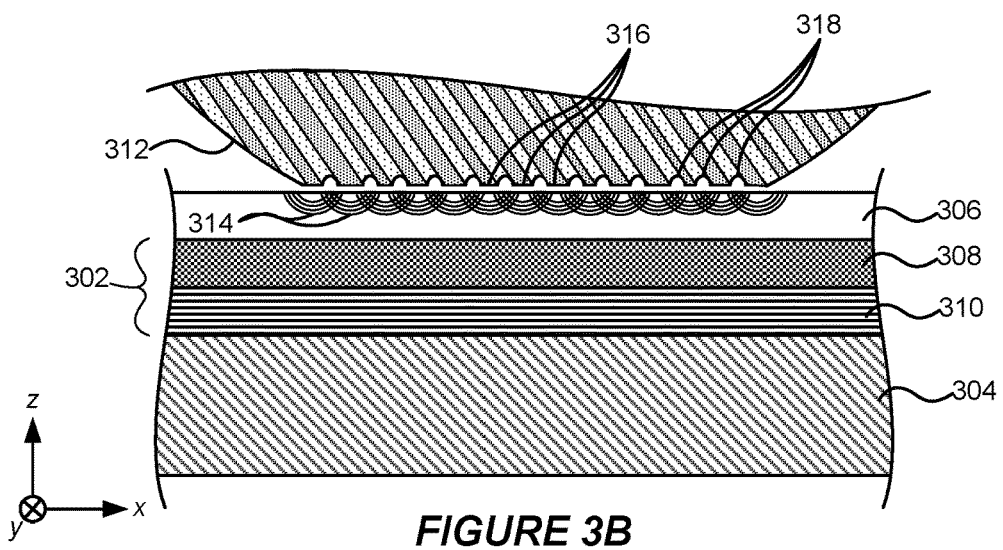
FIG. 3B shows a zoomed-in cross-sectional side view of the example ultrasonic sensing system of FIG. 3A according to some implementations.

FIG. 3A shows a cross-sectional projection view of a diagrammatic representation of a portion of an example ultrasonic sensing system 300 according to some implementations. FIG. 3B shows a zoomed-in cross-sectional side view of the example ultrasonic sensing system 300 of FIG. 3A according to some implementations. For example, the ultrasonic sensing system 300 may implement the ultrasonic sensing system 118 described with reference to FIG. 1 or the ultrasonic sensing system 200 shown and described with reference to FIGS. 2A and 2B. The ultrasonic sensing system 300 may include an ultrasonic transducer 302 that overlies a substrate 304 and that underlies a platen (a "cover plate" or "cover glass") 306. The ultrasonic transducer 302 may include both an ultrasonic transmitter 308 and an ultrasonic receiver 310.

The ultrasonic transmitter 308 is generally configured to generate ultrasonic waves towards the platen 306, and in the illustrated implementation, towards a human finger positioned on the upper surface of the platen. In some implementations, the ultrasonic transmitter 308 may more specifically be configured to generate ultrasonic plane waves towards the platen 306. In some implementations, the ultrasonic transmitter 308 includes a layer of piezoelectric material such as, for example, polyvinylidene fluoride (PVDF) or a PVDF copolymer such as PVDF-TrFE. For example, the piezoelectric material of the ultrasonic transmitter 308 may be configured to convert electrical signals provided by the controller of the ultrasonic sensing system into a continuous or pulsed sequence of ultrasonic plane waves at a scanning frequency. In some implementations, the ultrasonic transmitter 308 may additionally or alternatively include capacitive ultrasonic devices.

Figure 4:
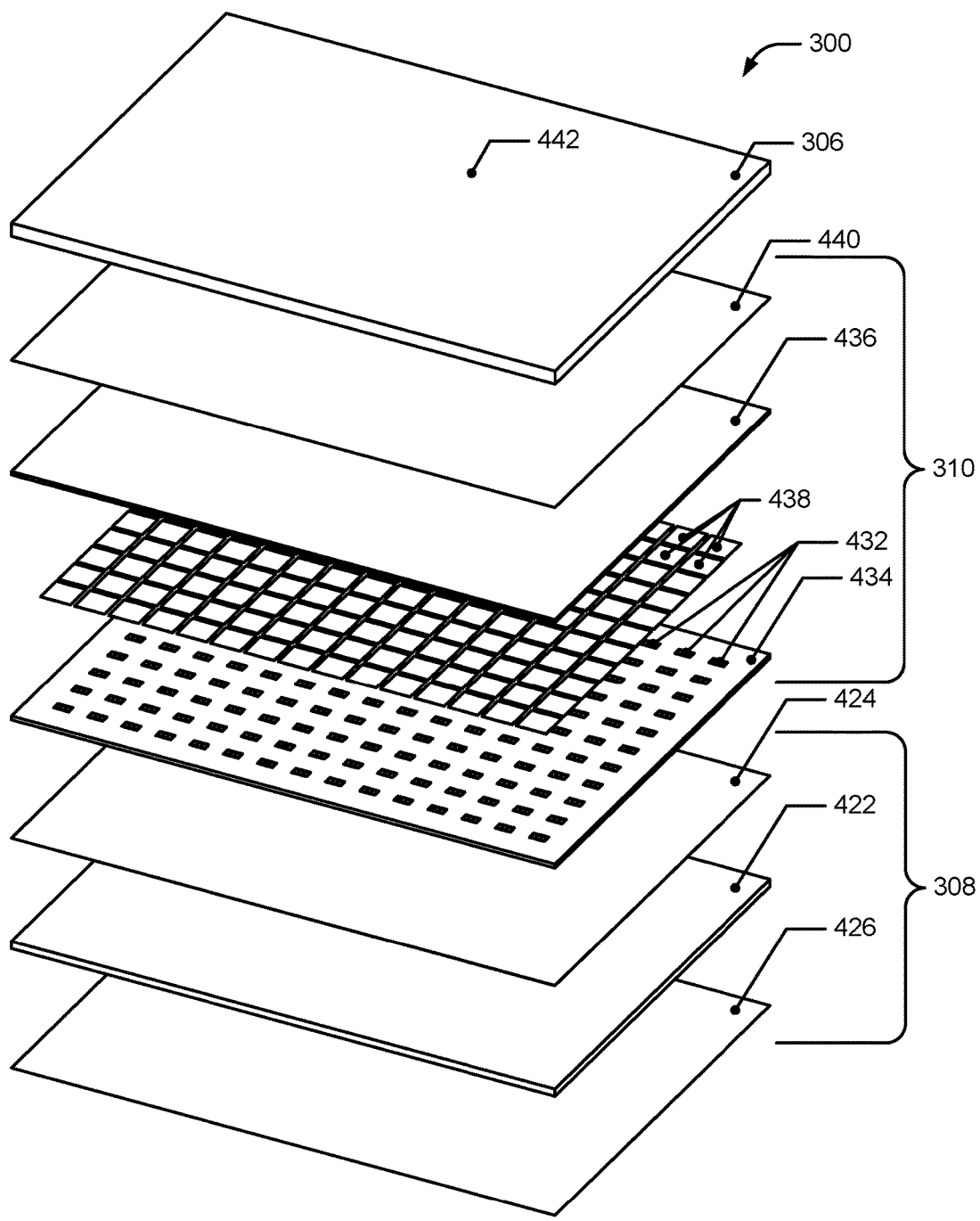
FIG. 4 shows an exploded projection view of example components of the example ultrasonic sensing system of FIGS. 3A and 3B according to some implementations.

The ultrasonic receiver 310 is generally configured to detect ultrasonic reflections 314 resulting from interactions of the ultrasonic waves transmitted by the ultrasonic transmitter 308 with ridges 316 and valleys 318 defining the fingerprint of the finger 312 being scanned. In some implementations, the ultrasonic transmitter 308 overlies the ultrasonic receiver 310 as, for example, illustrated in FIGS. 3A and 3B. In some other implementations, the ultrasonic receiver 310 may overlie the ultrasonic transmitter 308 (as shown in FIG. 4 described below). The ultrasonic receiver 310 may be configured to generate and output electrical output signals corresponding to the detected ultrasonic reflections. In some implementations, the ultrasonic receiver 310 may include a second piezoelectric layer different than the piezoelectric layer of the ultrasonic transmitter 308. For example, the piezoelectric material of the ultrasonic receiver 310 may be any suitable piezoelectric material such as, for example, a layer of PVDF or a PVDF copolymer. The piezoelectric layer of the ultrasonic receiver 310 may convert vibrations caused by the ultrasonic reflections into electrical output signals. In some implementations, the ultrasonic receiver 310 further includes a thin-film transistor (TFT) layer. In some such implementations, the TFT layer may include an array of sensor pixel circuits configured to amplify the electrical output signals generated by the piezoelectric layer of the ultrasonic receiver 310. The amplified electrical signals provided by the array of sensor pixel circuits may then be provided as raw measured image data to the processing unit for use in processing the image data, identifying a fingerprint associated with the image data, and in some applications, authenticating a user associated with the fingerprint. In some implementations, a single piezoelectric layer may serve as the ultrasonic transmitter 308 and the ultrasonic receiver 310. In some implementations, the substrate 304 may be a glass, plastic or silicon substrate upon which electronic circuitry may be fabricated. In some implementations, an array of sensor pixel circuits and associated interface circuitry of the ultrasonic receiver 310 may be configured from CMOS circuitry formed in or on the substrate 304. In some implementations, the substrate 304 may be positioned between the platen 306 and the ultrasonic transmitter 308 and/or the ultrasonic receiver 310. In some implementations, the substrate 304 may serve as the platen 306. One or more protective layers, acoustic matching layers, anti-smudge layers, adhesive layers, decorative layers, conductive layers or other coating layers (not shown) may be included on one or more sides of the substrate 304 and the platen 306.

The platen 306 may be formed of any suitable material that may be acoustically coupled to the ultrasonic transmitter 308. For example, the platen 306 may be formed of one or more of glass, plastic, ceramic, sapphire, metal or metal alloy. In some implementations, the platen 306 may be a cover plate such as, for example, a cover glass or a lens glass of an underlying display. In some implementations, the platen 306 may include one or more polymers, such as one or more types of parylene, and may be substantially thinner. In some implementations, the platen 306 may have a thickness in the range of about 10 microns ($\mu$m) to about 1000 $\mu$m or more.

In some implementations, the ultrasonic sensing system 300 may further include a focusing layer (not shown). For example, the focusing layer may be positioned above the ultrasonic transmitter 308. The focusing layer may generally include one or more acoustic lenses capable of altering the paths of ultrasonic waves transmitted by the ultrasonic transmitter 308. In some implementations, the lenses may be implemented as cylindrical lenses, spherical lenses or zone lenses. In some implementations, some or all of the lenses may be concave lenses, whereas in some other implementations some or all of the lenses may be convex lenses, or include a combination of concave and convex lenses.

In some implementations that include such a focusing layer, the ultrasonic sensing device 300 may additionally include an acoustic matching layer to ensure proper acoustic coupling between the focusing lens(es) and an object, such as a finger, positioned on the platen 306. For example, the acoustic matching layer may include an epoxy doped with particles that change the density of the acoustic matching layer. If the density of the acoustic matching layer is changed, then the acoustic impedance will also change according to the change in density, if the acoustic velocity remains constant. In alternative implementations, the acoustic matching layer may include silicone rubber doped with metal or with ceramic powder. In some implementations, sampling strategies for processing output signals may be implemented that take advantage of ultrasonic reflections being received through a lens of the focusing layer. For example, an ultrasonic wave coming back from a lens' focal point will travel into the lens and may propagate towards multiple receiver elements in a receiver array fulfilling the acoustic reciprocity principle. Depending on the signal strength coming back from the scattered field, an adjustment of the number of active receiver elements is possible. In general, the more receiver elements that are activated to receive the returned ultrasonic waves, the higher the signal-to-noise ratio (SNR). In some implementations, one or more acoustic matching layers may be positioned on one or both sides of the platen 306, with or without a focusing layer.

FIG. 4 shows an exploded projection view of example components of the example ultrasonic sensing system 300 of FIGS. 3A and 3B according to some implementations. The ultrasonic transmitter 308 may include a substantially planar piezoelectric transmitter layer 422 capable of functioning as a plane wave generator. Ultrasonic waves may be generated by applying a voltage across the piezoelectric transmitter layer 422 to expand or contract the layer, depending upon the voltage signal applied, thereby generating a plane wave. In this example, the processing unit (not shown) is capable of causing a transmitter excitation voltage to be applied across the piezoelectric transmitter layer 422 via a first transmitter electrode 424 and a second transmitter electrode 426. The first and second transmitter electrodes 424 and 426 may be metallized electrodes, for example, metal layers that coat opposing sides of the piezoelectric transmitter layer 422. As a result of the piezoelectric effect, the applied transmitter excitation voltage causes changes in the thickness of the piezoelectric transmitter layer 422, and in such a fashion, generates ultrasonic waves at the frequency of the transmitter excitation voltage.

The ultrasonic waves may travel towards a target object, such as a finger, passing through the platen 306. A portion of the ultrasonic waves not absorbed or transmitted by the target object may be reflected back through the platen 306 and received by the ultrasonic receiver 310, which, in the implementation illustrated in FIG. 4, overlies the ultrasonic transmitter 308. The ultrasonic receiver 310 may include an array of sensor pixel circuits 432 disposed on a substrate 434 and a piezoelectric receiver layer 436. In some implementations, each sensor pixel circuit 432 may include one or more TFT or CMOS transistor elements, electrical interconnect traces and, in some implementations, one or more additional circuit elements such as diodes, capacitors, and the like. Each sensor pixel circuit 432 may be configured to convert an electric charge generated in the piezoelectric receiver layer 436 proximate to the pixel circuit into an electrical signal. Each sensor pixel circuit 432 may include a pixel input electrode 438 that electrically couples the piezoelectric receiver layer 436 to the sensor pixel circuit 432.

In the illustrated implementation, a receiver bias electrode 440 is disposed on a side of the piezoelectric receiver layer 436 proximal to the platen 306. The receiver bias electrode 440 may be a metallized electrode and may be grounded or biased to control which signals may be passed to the array of sensor pixel circuits 432. Ultrasonic energy that is reflected from the exposed (upper/top) surface 442 of the platen 306 may be converted into localized electrical charges by the piezoelectric receiver layer 436. These localized charges may be collected by the pixel input electrodes 438 and passed on to the underlying sensor pixel circuits 432. The charges may be amplified or buffered by the sensor pixel circuits 432 and provided to the processing unit. The processing unit may be electrically connected (directly or indirectly) with the first transmitter electrode 424 and the second transmitter electrode 426, as well as with the receiver bias electrode 440 and the sensor pixel circuits 432 on the substrate 434. In some implementations, the processing unit may operate substantially as described above. For example, the processing unit may be capable of processing the signals received from the sensor pixel circuits 432.

Some examples of suitable piezoelectric materials that can be used to form the piezoelectric transmitter layer 422 or the piezoelectric receiver layer 436 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be utilized include polyvinylidene chloride (PVDC)

homopolymers and copolymers, polytetrafluoroethylene (PTFE) homopolymers and copolymers, and diisopropylammonium bromide (DIPAB).

The thickness of each of the piezoelectric transmitter layer 422 and the piezoelectric receiver layer 436 is selected so as to be suitable for generating and receiving ultrasonic waves, respectively. In one example, a PVDF piezoelectric transmitter layer 422 is approximately 28 µm thick and a PVDF-TrFE receiver layer 436 is approximately 12 µm thick. Example frequencies of the ultrasonic waves may be in the range of about 1 Megahertz (MHz) to about 100 MHz, with wavelengths on the order of a millimeter or less.

Figure 5:
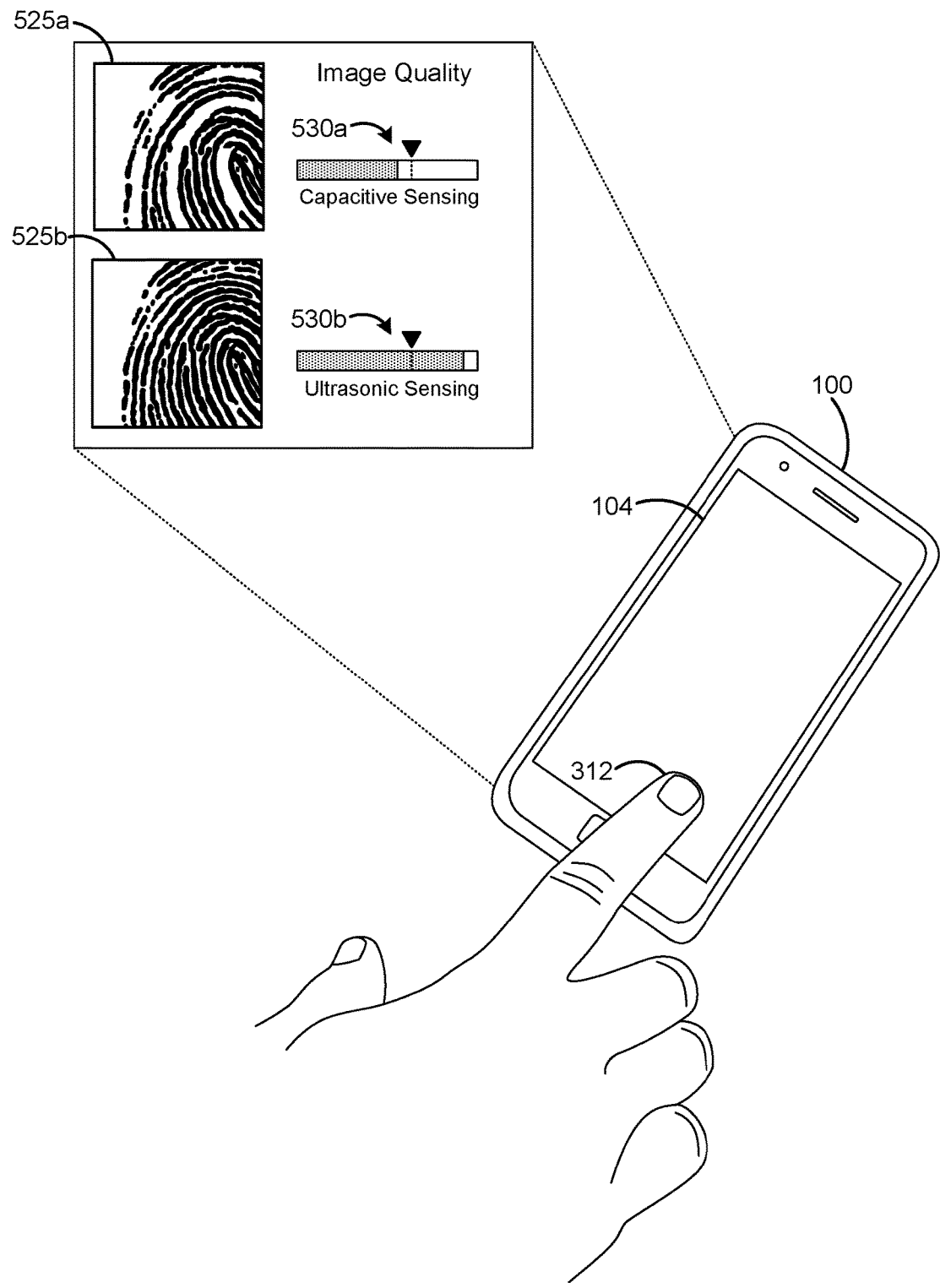
FIG. 5 shows an example of a fingerprint sensor capable of operating in a capacitive sensing mode and an ultrasonic sensing mode according to some implementations.

FIG. 5 shows an example of a fingerprint sensor capable of operating in a capacitive sensing mode and an ultrasonic sensing mode according to some implementations. In FIG. 5, a fingerprint of finger 312 may first be imaged by ultrasonic sensing system 118 operating in a capacitive sensing mode to generate fingerprint image data 525a representing an image of the fingerprint of finger 312. That is, fingerprint image data 525a may be the result of capacitive sensing of the fingerprint of finger 312. The image quality of fingerprint image data 525a may differ based on environmental conditions. For example, if finger 312 has residue, such as sweat or lotion, deposited upon it then the image quality of finger image data 525a may be low. If image quality 530a of fingerprint image data 525a is beneath a threshold image quality level (e.g., as indicated by the triangle and dotted line in the "quality meter" depicted in FIG. 5), then fingerprint image data 525a might not be of high enough quality to be useful for authentication of the fingerprint by comparing it with a pre-existing, authorized fingerprint stored by or accessible by (e.g., via a network connection) mobile device 100. As a result of the low image quality of fingerprint image data 525a, in FIG. 5, ultrasonic sensing system 118 of mobile device 100 may be switched to an ultrasonic sensing mode to generate fingerprint image data 525b. In FIG. 5, image quality 530b of fingerprint image data 525b is above the threshold image quality level, as indicated with the quality meter being above the triangle and dotted line. Accordingly, fingerprint image data 525b may be used to authenticate the fingerprint of finger 312. If authenticated, mobile device 100 may be "unlocked," resulting in access to its regular operational mode for a user, for example, by turning on display 104, "waking up" the applications processor, and/or allowing access to applications installed on mobile device 100.

Figure 6:
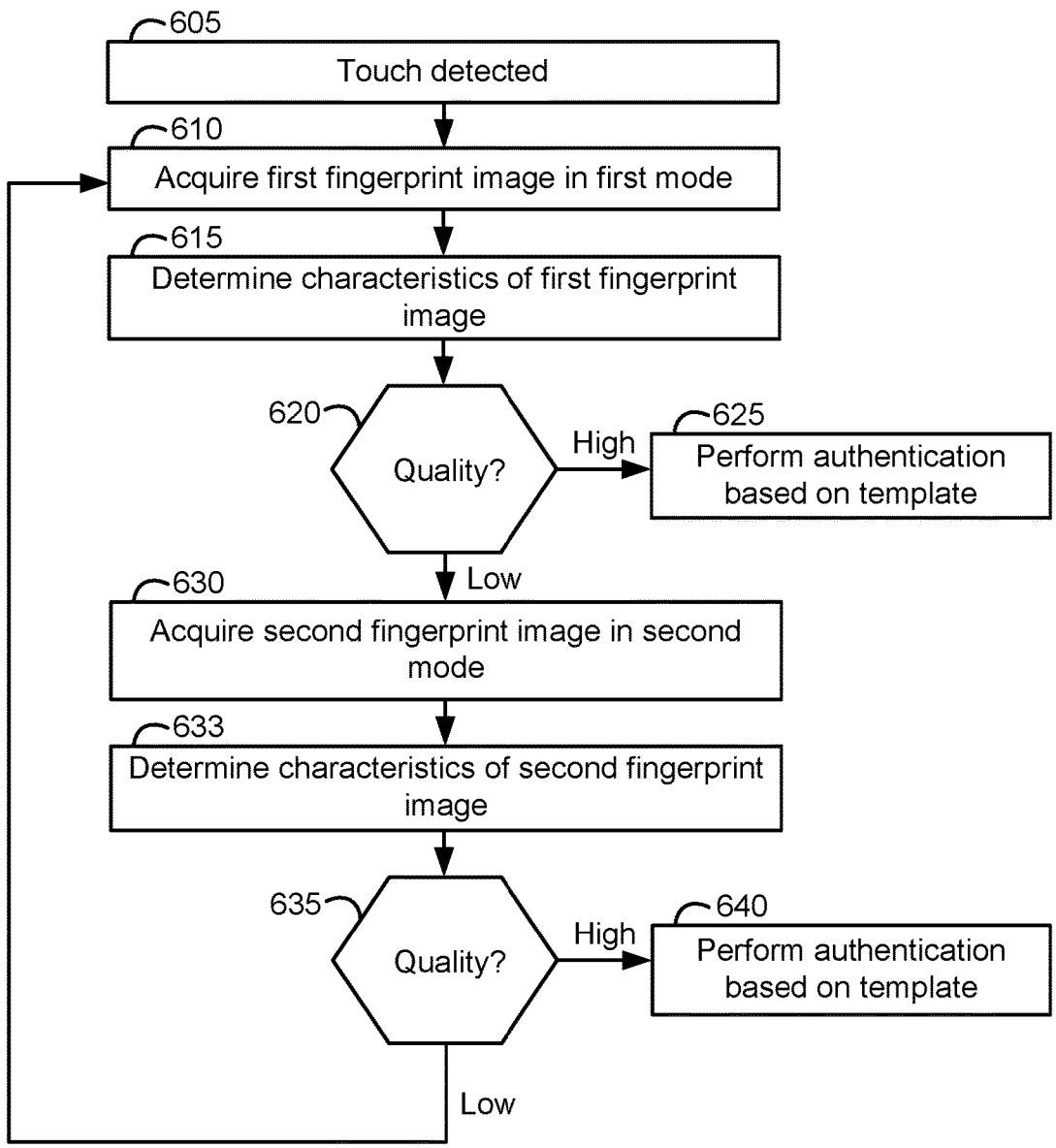
FIG. 6 shows an example of a flowchart of switching an operational mode of a fingerprint sensor based on characteristics of fingerprint image data.

In more detail, FIG. 6 shows an example of a flowchart of switching an operational mode of a fingerprint sensor based on characteristics of fingerprint image data. In FIG. 6, a mobile device might be in a "locked" state, for example, its display and/or the applications processor may be turned off or in a low-power (or "sleep") state. In block 605, a touch may be detected by the mobile device. For example, in FIG. 5, finger 312 may touch display 104 of mobile device 100. Ultrasonic sensing system 118 may be configured to operate in a first operating mode and the touch may be determined using that first operating mode. For example, if the first operating mode is a capacitive sensing mode, then the touch may be detected by determining whether a finger corresponding to a capacitance has touched the screen. In other implementations, the touch may be detected using ultrasonic sensing. In some implementations, a small portion of a fingerprint image may be generated in capacitive and/or ultrasonic sensing modes to determine the presence of finger 312 on display 104. In some implementations, a line-scan using ultrasonic sensing system 118 in capacitive or ultrasonic sensing modes.

As a result, at block 610, a first fingerprint image of the fingerprint of finger 312 may be generated in the first operating mode of ultrasonic sensing system 118. That is, one or more of the fingerprint sensors of ultrasonic sensing system 118 may be configured to operate in a particular operating mode to generate data representative of the fingerprint of finger 312. For example, ultrasonic sensing system 118 may be configured (either upon detection of a touch, or it has already been configured prior to the touch) to operate in a capacitive sensing mode such that fingerprint image data 525a of the fingerprint of finger 312 may be generated.

At block 615, characteristics of the first fingerprint image data may be determined. For example, image quality 530a of fingerprint image data 525a as depicted in FIG. 5 may be determined. Image quality 530a may be the result of one or more criteria such as a determination of contrast ratio (e.g., differences between the mean contrast for areas identified as fingerprint ridges 316 and areas identified as fingerprint valleys 318 making a finger print of fingerprint image data 525a), degradation (e.g., amount of noise or artifacts), ridge-contact area, missing ridge-valley information, minutia detection, or other metrics that may be correlated with a quality determination of an image of a fingerprint that is relevant to matching of the captured fingerprint image with a template stored during enrollment. The template stored during enrollment may represent an authorized fingerprint image, for example, of the owner or user of the mobile device that may also be captured using one or both capacitive and ultrasonic modes. As discussed later, the authorized fingerprint is used to compare with fingerprint image data to determine whether to unlock the mobile device. In some implementations, the operating mode that was used during the generation of the template during the enrollment process may also be stored.

In some implementations, the operating mode used to (or modes if both modes are used) generate the template may be considered when determining the primary mode for the fingerprint sensor. For example, the first operating mode (or primary mode, as discussed later herein) of block 610 may be selected to be the same operating mode that was used to generate the template. For example, if a template was generated using the fingerprint sensor in a capacitive sensing mode and data indicating that this mode was used is generated and associated with the template, then this information may be looked up and the fingerprint sensors of ultrasonic sensing system 118 may be configured to operate in that mode. The second operating mode (or alternative mode), as discussed below may be the operating mode that was not used to generate the template. If both modes were used to generate the template, then one of the modes may be prioritized over another (e.g., capacitive sensing mode as the primary mode).

In some implementations, the image quality of the template may also be stored in memory and associated with the template. The image quality of the template may then be used to determine the operating mode for the fingerprint sensor of ultrasonic sensing system 118. For example, if the image quality of the template is low (e.g., beneath a threshold image quality level), then the first operating mode may be selected to be capacitive sensing. If the image quality of the template is high (e.g., above the threshold image quality level), then the first operating mode may be selected to be ultrasonic sensing.

At block 620, the quality level of the first fingerprint image may be determined. For example, in FIG. 5, image quality 530a of fingerprint image data 525a is determined to be beneath the threshold image quality level. If image quality 530a was above the threshold image quality level (i.e., the image quality of fingerprint image data 525a is within a range corresponding to a normal-to-high quality image), then at block 625, the first fingerprint image may be authenticated. For example, fingerprint image data 525a in FIG. 5 may be analyzed by the processing unit to determine whether it matches an authorized fingerprint represented by the template, for example, previously provided by a user or determined by the mobile device. If authenticated, the mobile device may be unlocked.

If the image quality of the first fingerprint image is low, then, at block 630, a second fingerprint image may be acquired with the fingerprint sensor operating in a second mode of operation. For example, ultrasonic sensing system 118 may be configured to operate in an ultrasonic sensing mode such that fingerprint image data 525b of the fingerprint of finger 312 may be generated. That is, the fingerprint sensor may switch its operating mode from a preferred, primary capacitive sensing mode to an alternative, secondary ultrasonic sensing mode.

At block 633, characteristics of the second fingerprint image may be determined. For example, similar to block 615, image quality of fingerprint image data 525b may be determined to generate image quality 530b. In some implementations, the same characteristics for blocks 615 and 633 may be determined. In other implementations, different characteristics may be determined. For example, in the capacitive sensing mode, contrast ratio may be determinative of the image quality, but in the ultrasonic sensing mode, the amount of noise may be determinative of the image quality. At block 635, the image quality level of the second fingerprint image may be determined. For example, similar to block 620, image quality 530b of fingerprint image data 525b is determined. If image quality 530b is beneath the threshold image quality level, (i.e., it is a low image quality), then the fingerprint sensor may be reconfigured back to the first mode (e.g., capacitive sensing if the fingerprint sensor is in the ultrasonic sensing mode, or ultrasonic sensing if the fingerprint sensor is in the capacitive sensing mode) at block 610. However, if image quality 530 is above the threshold image quality level indicating that it is within a quality range representing a normal-to-high quality image, then at the second fingerprint image may be authenticated. That is, fingerprint image data 525b may be used for authentication and unlock the mobile device if authenticated.

As a result, the same fingerprint sensor may be operated in a primary mode of capacitive sensing and switch to an alternative mode of ultrasonic sensing if the fingerprint image generated via capacitive sensing does not provide an image quality useful for performing authentication. In other examples, the primary mode may be ultrasonic sensing and the alternative mode may be capacitive sensing. In some implementations, the threshold image quality level may be different between the two modes. For example, a fingerprint image generated via capacitive sensing may be of a lower minimum image quality to perform authentication than a fingerprint image generated via ultrasonic sensing, or vice versa. In some implementations, the primary mode may be set (e.g., set to be capacitive sensing) at a factory or other manufacturing facility depending on the sensor module configuration and expected performance of the two modes. For example, the fingerprint sensor may operate in the ultrasonic sensing mode as the primary mode when the sensor is located below a relatively thick cover glass while capacitive sensing mode is set as the primary mode when the sensor is covered with a thin plastic platen. Metrics such as frequencies of signals and acquisition time delays (as discussed later herein) may also be set based on the sensor module configuration and expected performances of the operating modes.

In some implementations, when the fingerprint sensor switches its operating mode from the preferred, primary mode to the alternative, secondary mode, an indication that this switch occurred may be stored and the primary mode and the alternative mode may be switched. For example, if at a first time the fingerprint sensor switches its operating mode from a primary capacitive sensing mode to an alternative ultrasonic sensing mode, then at a second time (after the first time), the primary mode may be ultrasonic sensing and the alternative mode may be capacitive sensing. As a result, the switching of the modes can be "learned" to adjust which sensing mode is the primary mode.

In some implementations, the primary mode may be selected based on the user using the mobile device. For example, multiple users may be authorized to use the mobile device, and therefore, authorized fingerprints of multiple users may be stored as templates by the mobile device and used to compare with fingerprint image data to determine whether to unlock the mobile device. Different users may have different primary modes. For example, the primary mode of a first user may be ultrasonic sensing and the alternative mode may be capacitive sensing. The primary mode of a second user may be capacitive sensing and the alternative mode may be ultrasonic sensing. In some implementations, the selection or determination of the primary mode and the alternative mode may be based on the finger being used for authentication. For example, if a thumb is being used, then the primary mode may be capacitive sensing and the alternative mode may be ultrasonic sensing. By contrast, if an index finger is being used, then the primary mode may be ultrasonic sensing and the alternative mode may be capacitive sensing.

In some implementations, mobile device may determine environmental conditions and then select the primary and alternative modes based on those environmental conditions. For example, if the ambient temperature is above a threshold temperature, then the primary mode may be selected to be different from the primary mode at or below the threshold temperature. For example, at or above 35° C. the primary mode may be selected to be ultrasonic sensing due to the likelihood of increased sweating of the user that may result in the disruption of capacitive sensing. The primary mode may be selected to be capacitive sensing if the temperature is below 35° C. Other environmental conditions, such as humidity, wind speed, light levels, vibrations, etc. may also be considered.

Additionally, characteristics of the mobile device may also be considered. For example, if the battery level of the mobile device decreases to a threshold battery level (e.g., below 20% of total capacity or capability of the battery), then the primary mode may be selected (or switched) to be capacitive sensing since it may use less power than ultrasonic sensing, and therefore, extend the remaining life of the mobile device before it needs to be recharged.

Figure 7:
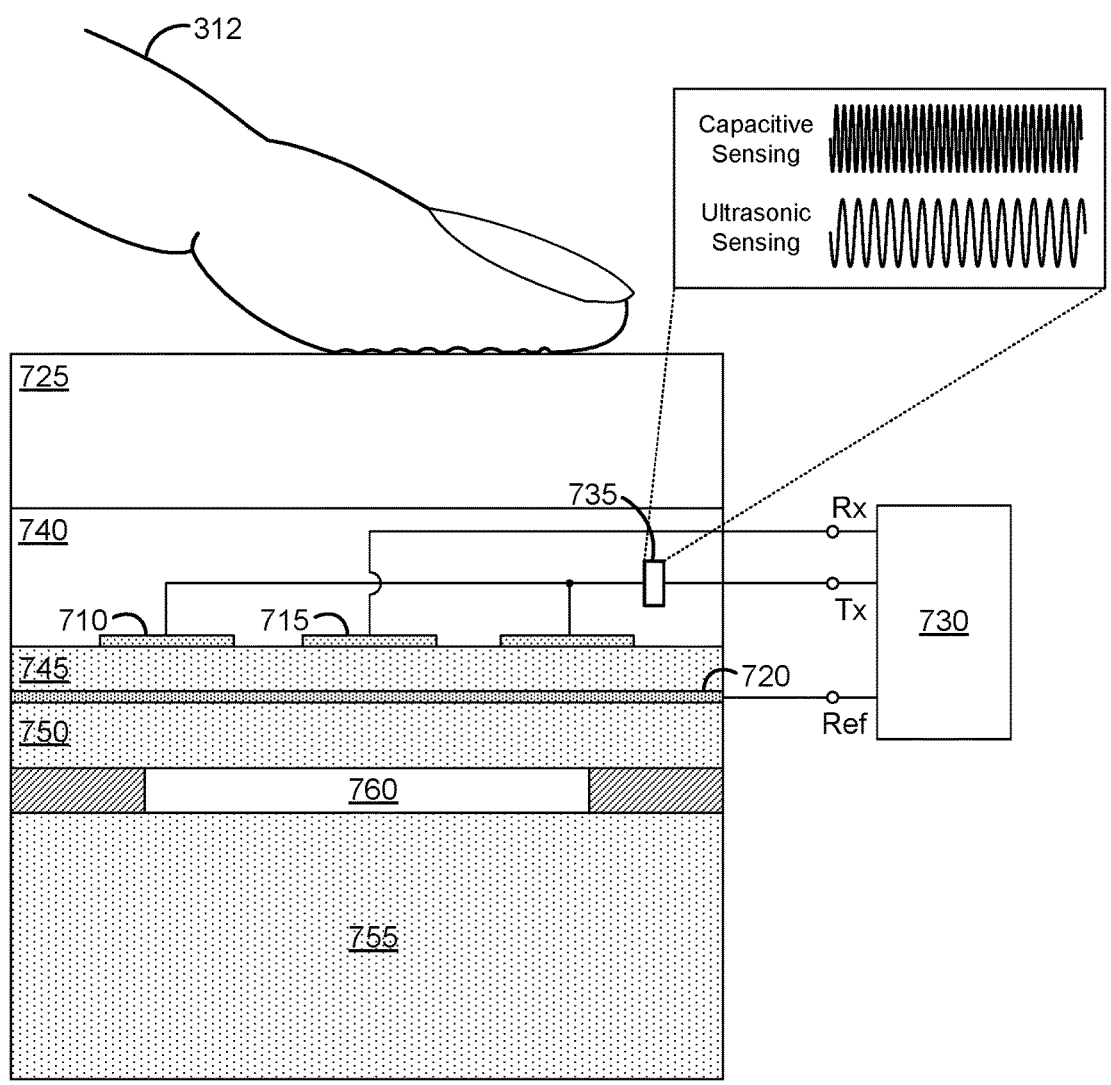
FIG. 7 shows an example of a cross-sectional side view of a fingerprint sensor.

The fingerprint sensors may form ultrasonic sensor array 212 of FIG. 2B and may be implemented with a variety of structures. FIG. 7 shows an example of a cross-sectional side view of a fingerprint sensor. In FIG. 7, a piezoelectric micromechanical ultrasonic transducer (PMUT) implements a fingerprint sensor including piezoelectric layer 745 as an active layer for ultrasonic sensing. Reference electrode 720 is disposed on one side of piezoelectric layer 745, and both receive electrode 715 and transmit electrode 710 are disposed on the other side of piezoelectric layer 745. The voltages applied to transmit electrode 710 and reference electrode 720 result in a voltage applied across piezoelectric layer 745, resulting in its deformation, for example, pushing down onto mechanical layer 750 and into vacuum 760 (e.g., relatively empty space, or space filled with gases rather than solid matter) and back up from vacuum 760. This creates an ultrasonic wave that propagates through coupling layer 740 and platen 725. Portions of the ultrasonic wave may be reflected back. For example, when the ultrasonic wave approaches the ridges and valleys of the fingerprint of finger 312, some portions of the ultrasonic wave reflect back to piezoelectric layer 745. This results in its deformation, and therefore, generation of a surface charge and a voltage across the piezoelectric material that may be used as an electrical output signal representing a portion of raw image data that represents fingerprint image data. The PMUT of FIG. 7 also may include pixel circuitry 755 that may be a TFT or complementary metal-oxide-semiconductor (CMOS) layer with a silicon substrate including an array of sensor pixel circuits, as previously discussed. Processing unit 730 represents the circuitry of ultrasonic sensor system 118, for example, processor 220, controller 214, and image processing module 218, as previously discussed.

In more detail, if reference electrode 720 is grounded (e.g., at 0 Volts (V) in some implementations) then drive signal 735 applied to transmit electrode 710 may allow for the generation of the ultrasonic wave if it is within a frequency range corresponding to a resonant frequency range of the piezoelectric material of piezoelectric layer 745. That is, if a signal is an alternating current (AC) signal that has a frequency within a resonant frequency range of the piezoelectric material, then the piezoelectric material may deform to generate a pressure wave. If that resonant frequency is within an ultrasonic frequency range, then the pressure wave would be an ultrasonic wave.

By contrast, if the frequency of drive signal 735 is outside of the resonant frequency range (or ultrasonic frequency range) of piezoelectric layer 745, then the PMUT may operate in a capacitive sensing mode. For example, the PMUT of FIG. 7 may operate in the capacitive sensing mode by having drive signal 735 be a higher frequency signal (i.e., above the resonant frequency range). In other implementations, drive signal 735 may be a lower frequency signal (i.e., beneath the resonant frequency range).

Figure 9:
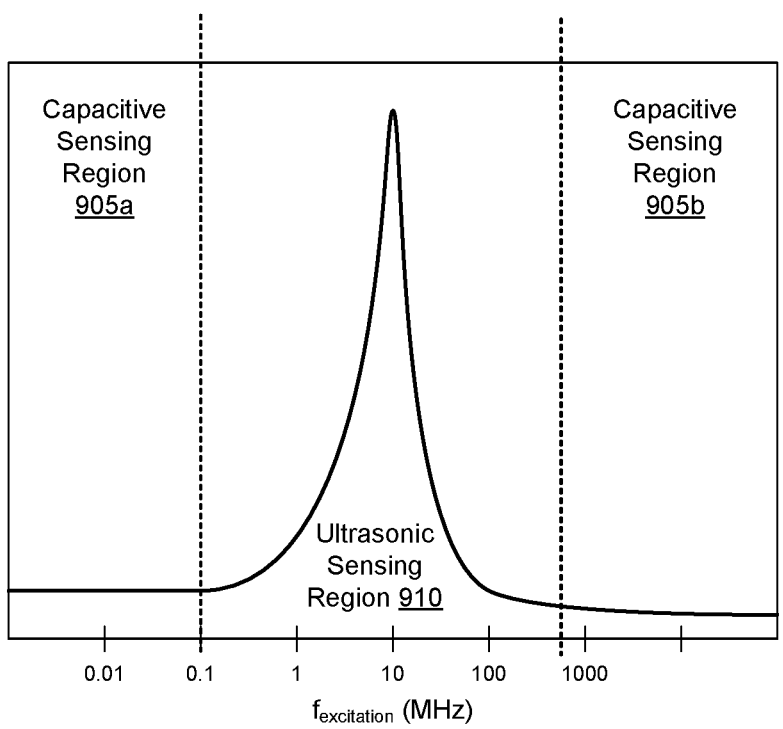
FIG. 9 shows an example of a relationship between a frequency of a drive signal and the operating mode of a fingerprint sensor.

FIG. 9 shows an example of a relationship between a frequency of a drive signal and the operating mode of a fingerprint sensor. In FIG. 9, $f_{excitation}$ represents the frequency of drive signal 735. Based on the type of piezoelectric material used for piezoelectric layer 745, the resonant frequency range for that material provides ultrasonic sensing region 910, which represents the frequencies for drive signal 735 to be applied to transmit electrode 710 (if reference electrode 720 is grounded) to generate an ultrasonic wave. Capacitive sensing regions 905a and 905b represent the ranges of frequencies that would result in little or no ultrasonic wave being generated, and therefore, the PMUT may operate in a capacitive sensing mode. The y-axis in FIG. 9 represents the amplitude of the pressure wave generated or the displacement (e.g., movement) of the PMUT membrane that results in the generation of the pressure wave.

Figure 8:
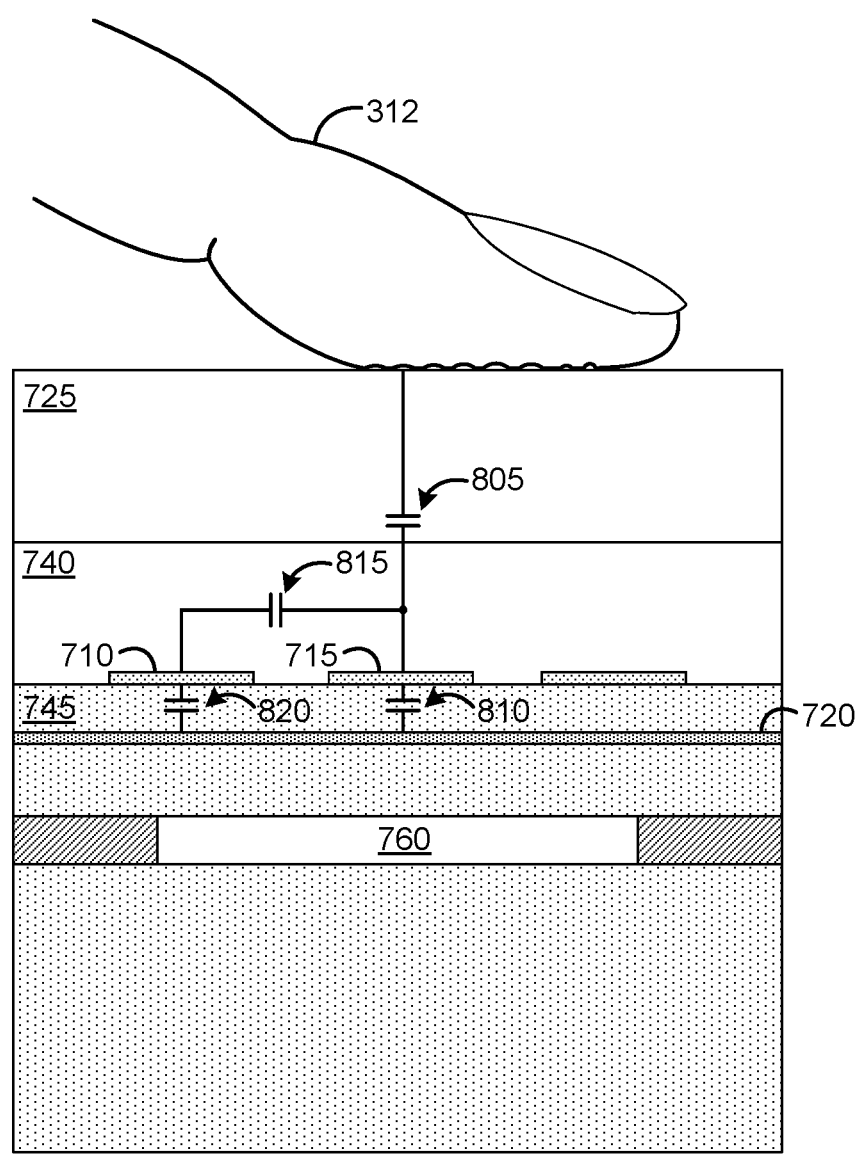
FIG. 8 shows an example of capacitive coupling of a fingerprint sensor according to some implementations.

The PMUT of FIG. 7 may operate in a capacitive sensing mode due to capacitive coupling. FIG. 8 shows an example of capacitive coupling of a fingerprint sensor according to some implementations. In FIG. 8, capacitive coupling between receive electrode 715 and finger 312 models one capacitor 805 of a capacitive voltage divider. The capacitive coupling between receive electrode 715 and reference electrode 720 models a second capacitor 810 of the capacitive voltage divider. Since the capacitors modeled by the capacitive coupling provide capacitances in series, the voltage at the intermediate point between them (i.e., receive electrode 715) may represent an electrical output signal at a voltage based on the values of the capacitances. That electrical output signal represents a portion of raw image data generated via capacitive sensing because the magnitude of the voltage of the electrical output signal may be dependent upon the presence of the ridges or valleys of the fingerprint of finger 312 (e.g., ridges or valleys would have different distances from receive electrode 715, and therefore, the capacitances would be different and result in different voltages). In other implementations, other electrodes may be used. For example, in FIG. 8, transmit electrode 710 may be used to model a capacitive voltage divider based on capacitors 815 and 820. As a result, the mutual capacitance between transmit electrode 710 and receive electrode 715 may be used to generate fingerprint image data, or the capacitance of receive electrode 715 to reference electrode 720 may be used to generate fingerprint image data.

Figure 10A:
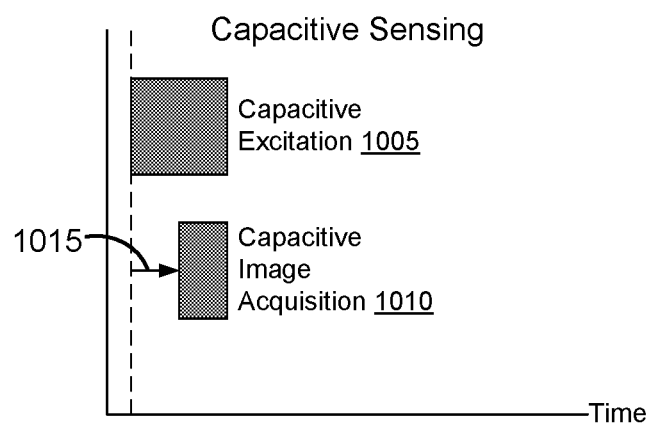
FIG. 10A shows an example of timing diagrams for a fingerprint sensor operating in a capacitive sensing mode.
Figure 10B:
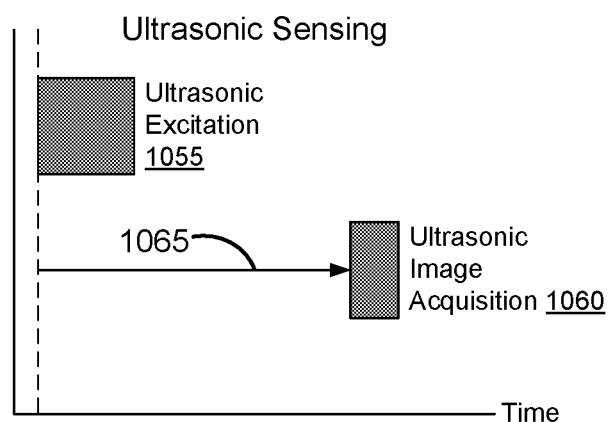
FIG. 10B shows an example of timing diagrams for a fingerprint sensor operating in an ultrasonic sensing mode.

Based on the operating mode of the fingerprint sensor, the acquisition time of the electrical output signals used to generate the raw image data of the fingerprint images may differ. FIG. 10A shows an example of timing diagrams for a fingerprint sensor operating in a capacitive sensing mode. In FIG. 10A, capacitive excitation 1005 represents the application of drive signal 735 having a frequency within capacitive sensing region 905a or 905b. Capacitive image acquisition 1010 represents when the electrical output signal may be sampled by processing unit 730 to generate the raw image data of the fingerprint. In the capacitive sensing mode, capacitive image acquisition 1010 may occur following a relatively short acquisition time 1015 because of the high speed of electromagnetic waves (e.g., at the speed of light if in a vacuum). By contrast, FIG. 10B shows an example of timing diagrams for a fingerprint sensor operating in an ultrasonic sensing mode. In FIG. 10B, ultrasonic excitation 1055 represents the application of drive signal 735 having a frequency within ultrasonic sensing region 910. Since an ultrasonic wave needs to be generated and reflected back, acquisition time 1065 in FIG. 10B may be longer in time than acquisition time 1015 in FIG. 10A because ultrasonic waves travel significantly slower than electromagnetic waves. As a result, ultrasonic image acquisition 1060 occurs following a relatively longer acquisition time than capacitive image acquisition 1010. This results in processing unit 730 waiting longer in the ultrasonic sensing mode before sampling the electrical output signal at receive electrode 715 to generate the raw image data.

Accordingly, the same structure (e.g., the PMUT of FIG. 7) may be operated with different drive signals (e.g., different frequencies for drive signal 735) applied to the same electrode, along with different acquisition times based on the operating mode, to switch between a capacitive sensing mode and an ultrasonic sensing mode.

Figure 11:
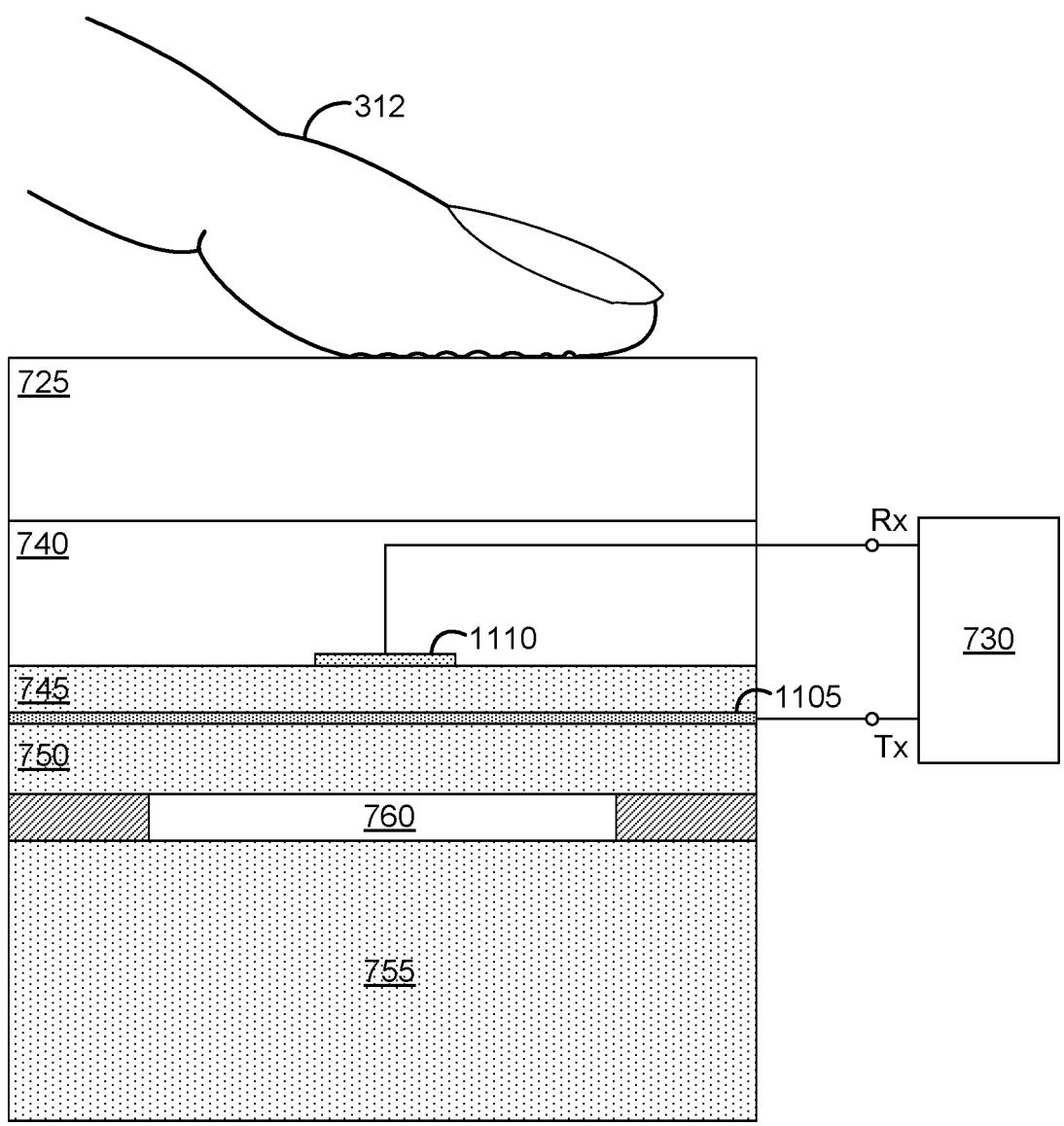
FIG. 11 shows another example of a cross-sectional side view of a fingerprint sensor.
Figure 12:
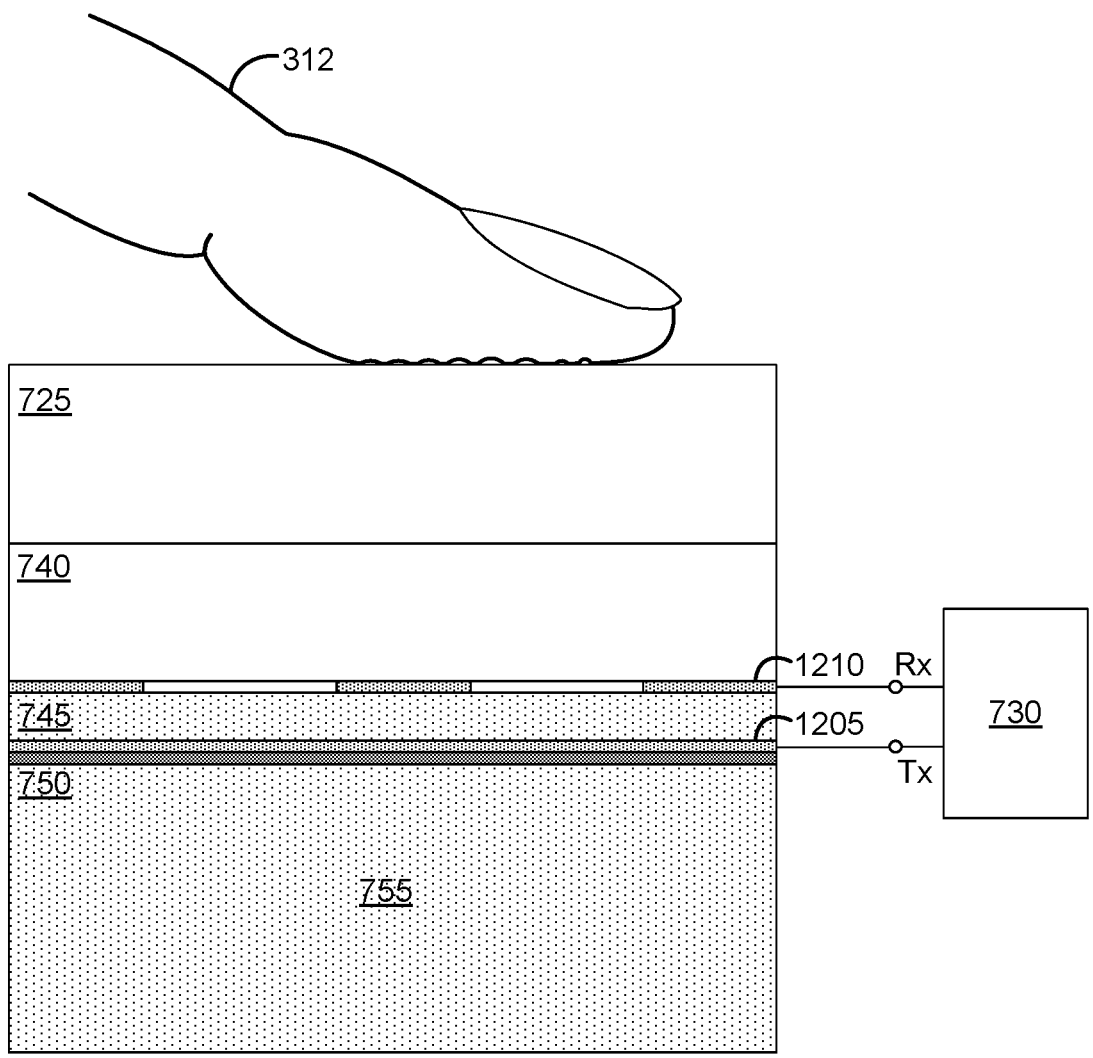
FIG. 12 shows another example of a cross-sectional side view of a fingerprint sensor.
Figure 13:
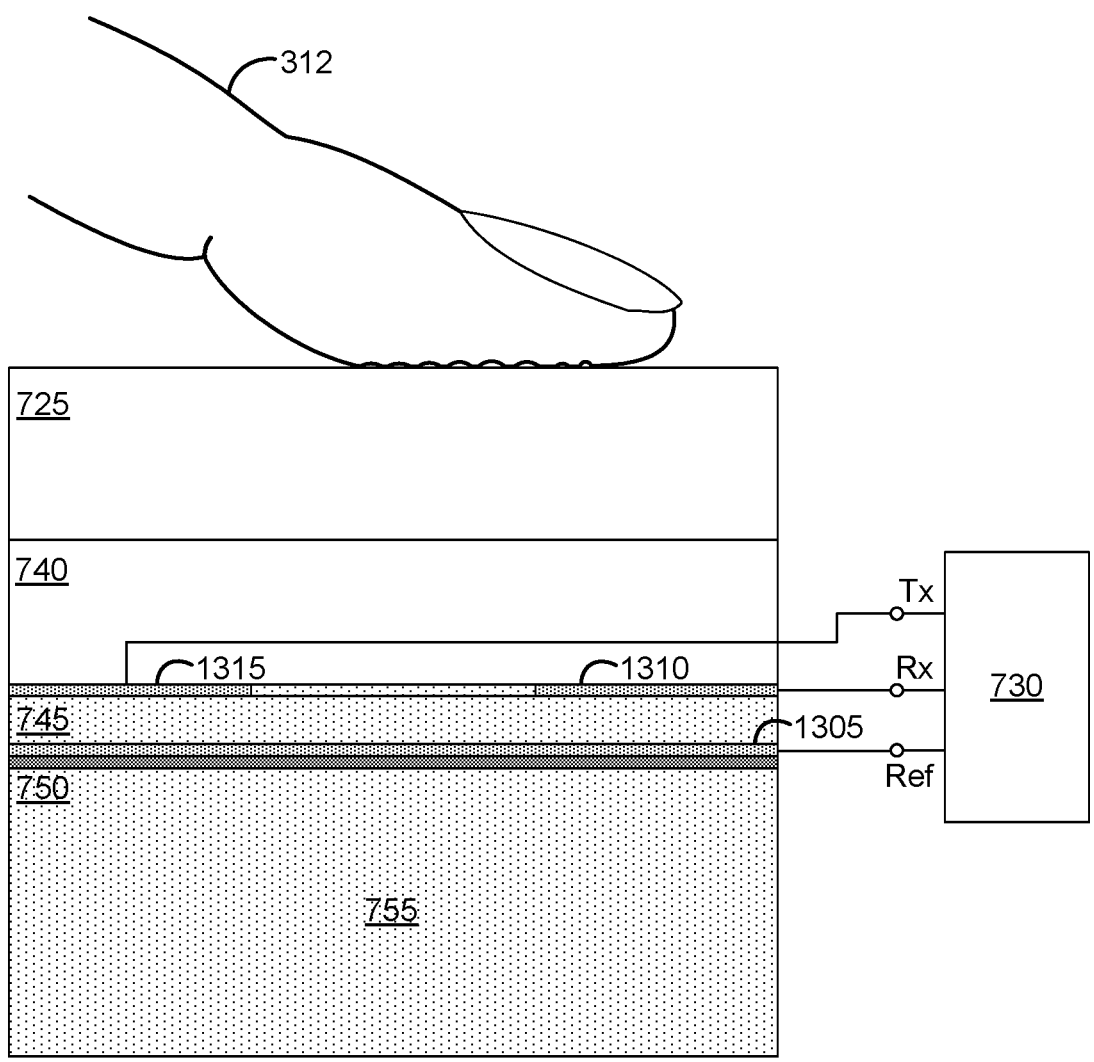
FIG. 13 shows another example of a cross-sectional side view of a fingerprint sensor.

Other structures may be used to configure a fingerprint sensor between a capacitive sensing mode and an ultrasonic sensing mode. FIG. 11 shows another example of a cross-sectional side view of a fingerprint sensor. In FIG. 11, a two-terminal PMUT includes receive electrode 1150 on one side of piezoelectric layer 745 and transmit electrode 1105 on the other side. Drive signal 735 may be applied to transmit electrode 1105 and the electrical output signal provided at receive electrode 1110 may be sampled to generate the raw image data. FIG. 12 shows another example of a cross-sectional side view of a fingerprint sensor. In FIG. 12, a two-terminal transducer (e.g., implemented with Polyvinylidene fluoride (PVDF), polyvinylidenefluoride-co-trifluoroethylene (PVDF-TrFE), or lead zirconate titanate (PZT)) having receive electrode 1210 (shown as a pixelated or patterned electrode with three portions such that each fingerprint sensor includes its own pixelated electrode) and transmit electrode 1205 may also operate in a similar manner as described above. FIG. 13 shows another example of a cross-sectional side view of a fingerprint sensor. In FIG. 13, receive electrode 1310, transmit electrode 1315, and reference electrode 1305 also may operate similar to the examples described above.

Figure 14:
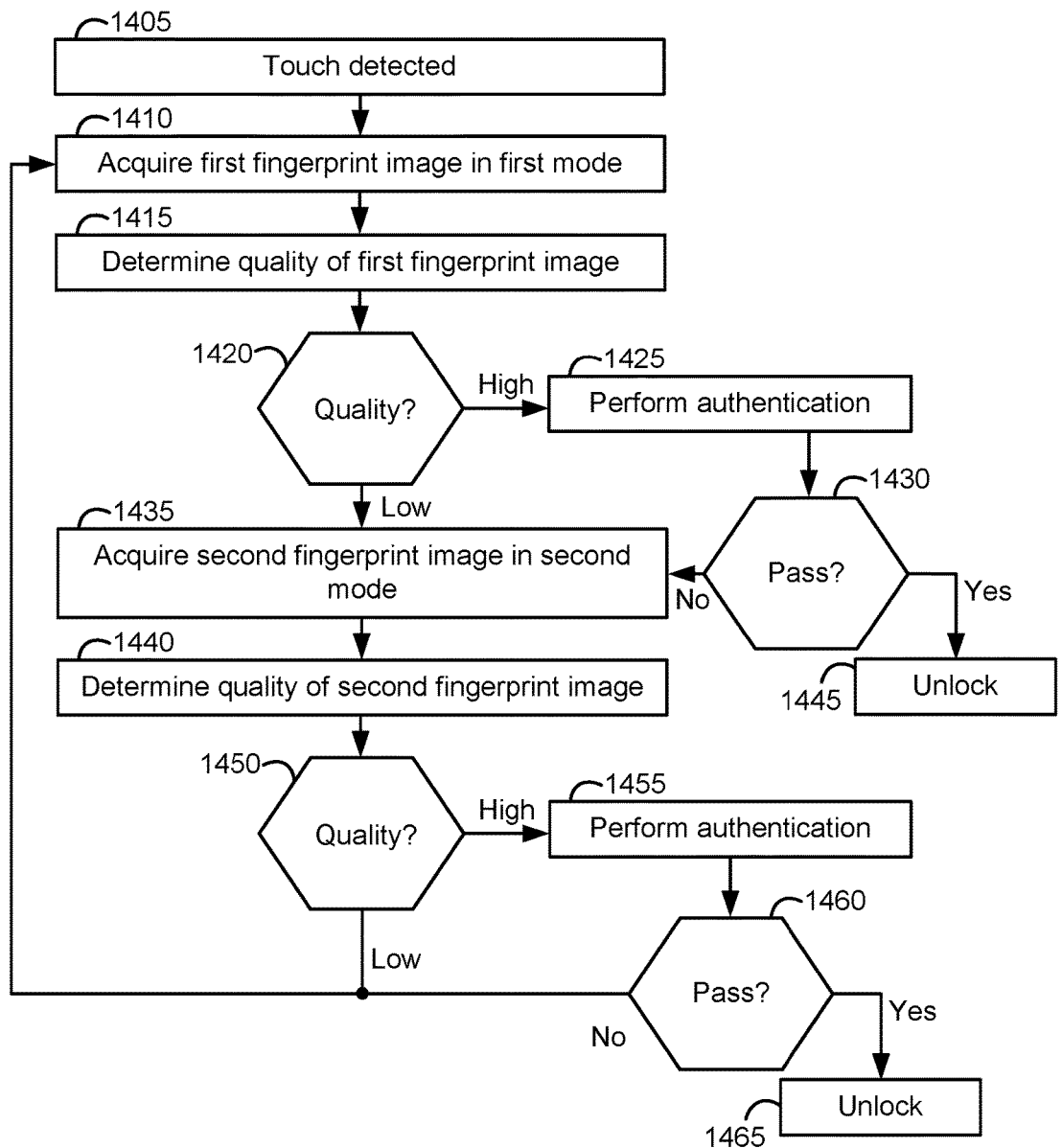
FIG. 14 shows an example of a flowchart of operating a fingerprint sensor in a capacitive sensing mode and an ultrasonic sensing mode.

In some implementations, the fingerprint sensor also may switch to the second, alternative operating mode if the authentication following the first, preferred mode fails. In more detail, FIG. 14 shows an example of a flowchart of operating a fingerprint sensor in a capacitive sensing mode and an ultrasonic sensing mode. In FIG. 14, at block 1405, a touch may be detected. For example, as previously discussed, finger 312 may be placed upon display 104 of mobile device 100. At block 1410, a first fingerprint image of the fingerprint of the finger may be generated. For example, raw image data corresponding to a fingerprint of finger 312 may be generated with ultrasonic sensing system 118 operating in a first, preferred capacitive sensing mode. At block 1415, the image quality of the first fingerprint image may be determined. At block 1420, that image quality may be compared with a threshold quality level. If the image quality of the first fingerprint image is high, then at block 1425, authentication may be performed. At block 1430, if the fingerprint corresponding to the first fingerprint image matches (e.g., similar) an authorized fingerprint, then at block 1445, the mobile device may be unlocked. However, if the authentication fails, then at block 1435, a second fingerprint image may be acquired with the fingerprint sensor operating in a second mode. For example, the second, alternative mode may be the ultrasonic sensing mode. Returning to block 1420, if the image quality was low, then the second fingerprint image also may be acquired at block 1435.

At block 1435, the second fingerprint image in the second mode may be acquired by configuring the fingerprint sensor to operate in the second mode, for example, by applying a different drive signal to an electrode. As previously discussed, the drive signal to operate the fingerprint sensor in the ultrasonic sensing mode may have a frequency within the resonant frequency range of the piezoelectric material of the fingerprint sensor. This is in contrast with operating the fingerprint sensor in the capacitive sensing mode, in which the drive signal may have a different frequency that is outside of the resonant frequency range of the piezoelectric material.

At block 1440, the image quality of the second fingerprint image may be determined. At block 1450, the image quality of the second fingerprint image may be compared with a threshold image quality level. If the quality level is high, then at block 1455, authentication may be performed. At block 1460, if the authentication is successful, then at block 1465, the mobile device may be unlocked. However, if the authentication is a failure, then at block 1410, another fingerprint image may be acquired by reconfiguring the fingerprint sensor to operate in the first operating mode again (e.g., capacitive sensing mode if the second mode is the ultrasonic sensing mode). Returning to block 1450, if the image quality is low, then the fingerprint sensor also may be reconfigured to operate in the first operating mode again at block 1410.

Figure 15:
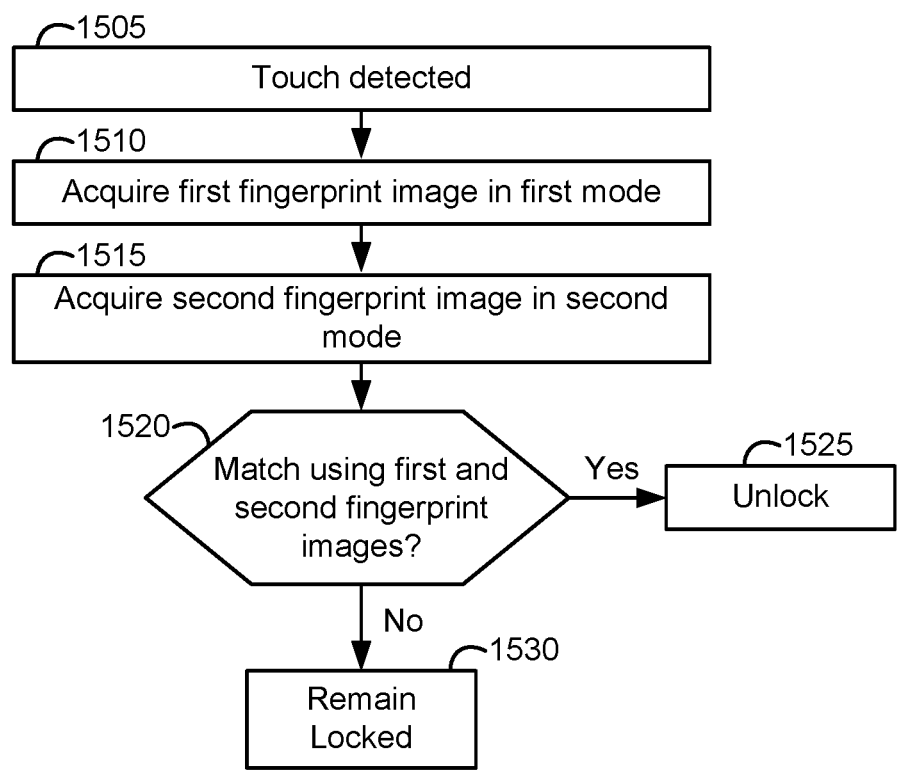
FIG. 15 shows an example of a flowchart of authenticating a fingerprint based on both a capacitive sensing mode and an ultrasonic sensing mode.

In some implementations, fingerprint images may be acquired in both capacitive sensing and ultrasonic sensing modes. The fingerprint images resulting from both of the modes may then be considered when performing authentication. In more detail, FIG. 15 shows an example of a flowchart of authenticating a fingerprint based on both a capacitive sensing mode and an ultrasonic sensing mode. In FIG. 15, at block 1505, a touch may be detected. For example, as previously discussed, a finger may be placed upon a display of a mobile device and that touch may be detected, as previously discussed. At block 1510, a first fingerprint image in a first mode may be acquired. For example, the fingerprint sensor may be configured to operate in a capacitive sensing mode, as previously discussed, and the first fingerprint image may be generated based on the raw image data acquired from the fingerprint sensor operating in that mode. Next, at block 1515, a second fingerprint image may be acquired in a second operating mode. For example, the fingerprint sensor may next be configured to operate in an ultrasonic sensing mode, as previously discussed, and the second fingerprint image may be generated based on the raw image data acquired from the fingerprint sensor operating in the second mode. As a result, two fingerprint images may be generated using the two different modes.

Next, at block 1520, both of the fingerprint images may be used for authentication purposes, and if the authentication is successful, then at block 1525 the mobile device may be unlocked. However, if the authentication fails, then at block 1530, the mobile device remains unlocked.

Figure 16:
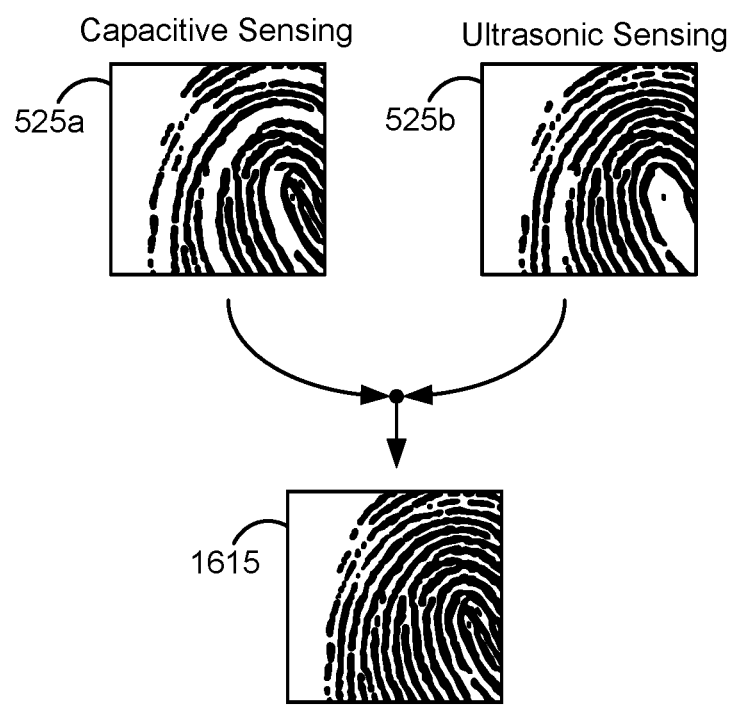
FIG. 16 shows an example of generating fingerprint image data based on both a capacitive sensing mode and an ultrasonic sensing mode.

The two fingerprint images may be used together for authentication in a variety of ways. FIG. 16 shows an example of generating fingerprint image data based on both a capacitive sensing mode and an ultrasonic sensing mode. In FIG. 16, fingerprint image 525*a* generated via capacitive sensing and fingerprint image 525*b* generated via ultrasonic sensing may both be of relatively low quality. For example, as depicted in FIG. 16, both fingerprint image 525*a* and fingerprint image 525*b* may be missing some visual detail (e.g., represented by the empty spaces). However, some of the missing detail may be mutually exclusive of the other fingerprint image. That is, the portions of fingerprint image 525*a* that may be missing or of lower quality may be present or of higher quality in fingerprint image 525*b*, and vice versa. As a result, processing unit 730 may generate fingerprint image 1615 from fingerprint image 525*a* and 525*b*, for example, by acquiring the higher quality or present portions of the fingerprint from the respective fingerprint images 525*a* and 525*b*.

In some implementations, the first, preferred mode and the second, alternative mode may switch. For example, at a first time, the first mode may be the capacitive sensing mode and the second mode may be the ultrasonic sensing mode. At a second time (after the first time), the first mode may be the ultrasonic sensing mode and the second mode may be the capacitive sensing mode. This may be performed if the first mode repeatedly provides a fingerprint image beneath the threshold image quality level while the second mode repeatedly provides a fingerprint image above the threshold image quality level. For example, if the fingerprint image data generated with the fingerprint sensor operating in the capacitive sensing mode is beneath the threshold image quality level ten times in a row, but the fingerprint image data generated with the fingerprint sensor operating in the ultrasonic sensing mode is above the threshold image quality level ten times in a row, then the order of performing the modes may switch such that the ultrasonic sensing mode is now the preferred mode and the capacitive sensing mode is the alternative mode.

In some implementations, the fingerprint sensor may be used for recognizing gestures utilizing one or more fingers detected upon the display of a mobile device. The fingerprint sensor may be configured to operate between the capacitive and ultrasonic sensing modes. For example, gestures including interactions with the display such as swiping in a direction, tapping in a particular location, "long" taps (e.g., keeping a finger upon the display for an extended period of time), etc. may be recognized by operating the fingerprint sensor in either capacitive or ultrasonic sensing modes.

As a result, the same fingerprint sensor may be used in different functional modes to detect touches, authenticate a fingerprint, and recognize gestures. Each of these different functionalities may result in the fingerprint sensor operating in the capacitive sensing mode or the ultrasonic sensing mode. That is, the primary mode and the alternative mode for the fingerprint sensor may vary based on how the fingerprint sensor is being used. For example, for detecting touches, the fingerprint sensor may operate in a capacitive sensing mode as the primary mode since it is relatively low power and touches may occur frequency. The fingerprint sensor may switch to the ultrasonic sensing mode if the capacitive sensing mode is not performing well. If the fingerprint should be authenticated, then the fingerprint sensor may be configured to operate with the ultrasonic sensing mode as the primary mode and the capacitive sensing mode as the alternative mode. When the fingerprint sensor is being used to recognize gestures, then the fingerprint sensor may operate in the capacitive sensing mode as the primary mode and the ultrasonic sensing mode as the alternative mode.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module that may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A system comprising:
   a fingerprint sensor; and
   a controller configured to switch the fingerprint sensor from operating in a first operational mode to a second operational mode based on one or more characteristics of a first fingerprint image data generated based on the fingerprint sensor operating in the first operational mode, wherein the one or more characteristics include an image quality corresponding to an image of a fingerprint represented by the first fingerprint image data, wherein the controller is further configured to determine one or more characteristics of a second fingerprint image data generated based on the fingerprint sensor operating in the second operational mode, and authenticate a fingerprint represented by the second fingerprint image data based on the one or more characteristics of the second fingerprint image data, one of the first operational mode or the second operational mode being a capacitive sensing mode and the other being an ultrasonic sensing mode.

2. The system of claim 1, wherein the one or more characteristics of the first fingerprint image data include a first image quality corresponding to a first image of a fingerprint, and the one or more characteristics of the second fingerprint image data include a second image quality corresponding to a second image of the fingerprint.

3. The system of claim 2, wherein the second image quality is higher than the first image quality, and the controller is configured to authenticate the fingerprint corresponding to the second fingerprint image data based on the second image quality meeting or exceeding a threshold image quality.

4. The system of claim 1, wherein the controller is further configured to provide a first drive signal to an electrode of the fingerprint sensor to operate the fingerprint sensor in the first operational mode, and configured to provide a second drive signal to the electrode of the fingerprint sensor to operate the fingerprint sensor in the second operational mode, the first drive signal and the second drive signal being different.

5. The system of claim 4, wherein the first drive signal and the second drive signal are at different frequencies.

6. The system of claim 4, wherein the fingerprint sensor includes a piezoelectric material layer, and one of the first drive signal or the second drive signal corresponding to the fingerprint sensor operating in the ultrasonic sensing mode is within a frequency range corresponding to a resonant frequency of the piezoelectric material layer, the other of the first drive signal or the second drive signal corresponding to the fingerprint sensor operating in the capacitive sensing mode is outside the frequency range.

7. The system of claim 1, wherein the controller is further configured to receive the first fingerprint image data generated based on the fingerprint sensor operating in the first operational mode and receive a second fingerprint image data generated based on the fingerprint sensor operating in the second operational mode, and generate a third fingerprint image data based on the first fingerprint image data and the second fingerprint image data.

8. The system of claim 1, wherein the controller is further configured to read one or more signals from the fingerprint sensor when the fingerprint sensor is operating in the capacitive sensing mode and the ultrasonic sensing mode, the reading of the one or more signals based on an acquisition time delay corresponding to the operational mode of the fingerprint sensor.

9. A method comprising:
   configuring, by a controller, a fingerprint sensor to operate in a first operational mode to generate a first fingerprint image data;
   determining one or more characteristics of the first fingerprint image data, wherein determining the characteristics of the first fingerprint image data includes determining a first image quality of a first image of a fingerprint represented by the first fingerprint image data;
   configuring, by the controller, the fingerprint sensor to operate in a second operational mode to generate a second fingerprint image data, the fingerprint sensor configured to operate in the second operational mode based on the one or more characteristics of the first fingerprint image data, wherein the first image quality of the first image of the fingerprint represented by the first fingerprint image data is at or beneath a threshold image quality, and the fingerprint sensor is configured to operate in the second operational mode based on the first image quality being at or beneath the threshold image quality;
   determining one or more characteristics of the second fingerprint image data; and
   authenticating a fingerprint represented by the second fingerprint image data based on the one or more characteristics of the second fingerprint image data.

10. The method of claim 9, wherein one of the first operational mode or the second operational mode is a capacitive sensing mode and the other is an ultrasonic sensing mode.

11. The method of claim 9, wherein determining characteristics of the second fingerprint image data includes determining a second image quality of a second image of the fingerprint represented by the second fingerprint image data, the second image quality being higher than the first image quality.

12. The method of claim 11, wherein the second image quality meets or exceeds the threshold image quality, and the authenticating of the fingerprint is based on the second image quality meeting or exceeding the threshold image quality.

13. A non-transitory medium having software stored thereon, the software including instructions for controlling a system to:
- configure a fingerprint sensor to operate in a first operational mode to generate a first fingerprint image data;
- determine one or more characteristics of the first fingerprint image data, wherein determining the characteristics of the first fingerprint image data includes determining a first image quality of a first image of a fingerprint represented by the first fingerprint image data, and wherein the first image quality of the first image of the fingerprint represented by the first fingerprint image data is at or beneath a threshold image quality, and the fingerprint sensor is configured to operate in a second operational mode based on the first image quality being at or beneath the threshold image quality;
- configure the fingerprint sensor to operate in the second operational mode to generate a second fingerprint image data, the fingerprint sensor configured to operate in the second operational mode based on the one or more characteristics of the first fingerprint image data;
- determine one or more characteristics of the second fingerprint image data; and
- authenticate a fingerprint represented by the second fingerprint image data based on the one or more characteristics of the second fingerprint image data.

14. The non-transitory medium of claim 13, wherein one of the first operational mode and the second operational mode is a capacitive sensing mode and the other is an ultrasonic sensing mode.

15. The non-transitory medium of claim 13, wherein determining characteristics of the second fingerprint image data includes determining a second image quality of a second image of the fingerprint represented by the second fingerprint image data, the second image quality being higher than the first image quality, and wherein the second image quality meets or exceeds the threshold image quality, and the authenticating of the fingerprint is based on the second image quality meeting or exceeding the threshold image quality.

16. A system having a touchscreen display comprising:
- a fingerprint sensor; and
- a controller configured to operate the fingerprint sensor in a touch recognition mode having a first operational mode as a primary mode to determine that a finger has touched the touchscreen display and a second operational mode as an alternative mode to determine that the finger has touched the touchscreen display, and operate the fingerprint sensor in a fingerprint authentication mode having the second operational mode as the primary mode and the first operational mode as an alternative mode to determine that a fingerprint of the finger corresponds to an authorized fingerprint, wherein the controller is further configured to operate the fingerprint sensor in a gesture recognition mode to determine interactions of one or more fingers with the touchscreen display having the first operational mode as the primary mode and the second operational mode as the alternative mode.

17. The system of claim 16, wherein one of the first operational mode or the second operational mode being a capacitive sensing mode and the other being an ultrasonic sensing mode.

18. The system of claim 16, wherein the first operational mode is capacitive sensing, and the second operational mode is ultrasonic sensing.

* * * * *